United States Patent
Zhang

(10) Patent No.: US 11,115,240 B2
(45) Date of Patent: Sep. 7, 2021

(54) METHODS, APPARATUSES, AND SYSTEMS FOR PERFORMING ANALOG CSI FEEDBACK

(71) Applicant: Alcatel Lucent, Nozay (FR)

(72) Inventor: Qingchuan Zhang, Shanghai (CN)

(73) Assignee: Alcatel Lucent, Nozay (FR)

( * ) Notice: Subject to any disclaimer, the term of this patent is extended or adjusted under 35 U.S.C. 154(b) by 18 days.

(21) Appl. No.: 16/301,224

(22) PCT Filed: Apr. 13, 2017

(86) PCT No.: PCT/IB2017/000618
§ 371 (c)(1),
(2) Date: Nov. 13, 2018

(87) PCT Pub. No.: WO2017/195030
PCT Pub. Date: Nov. 16, 2017

(65) Prior Publication Data
US 2019/0312753 A1    Oct. 10, 2019

(30) Foreign Application Priority Data

May 12, 2016 (CN) .......................... 201610317239.0

(51) Int. Cl.
*H04L 27/00* (2006.01)
*H04L 25/02* (2006.01)
*H04B 7/06* (2006.01)

(52) U.S. Cl.
CPC ......... *H04L 25/021* (2013.01); *H04B 7/0619* (2013.01); *H04B 7/0626* (2013.01); *H04L 25/0248* (2013.01)

(58) Field of Classification Search
CPC .. H04B 7/0619; H04B 7/0626; H04B 7/0639; H04L 25/021; H04L 25/0248
See application file for complete search history.

(56) References Cited

U.S. PATENT DOCUMENTS

| 7,411,929 | B2* | 8/2008 | Ling ................... H04B 7/0632 |
| | | | 370/334 |
| 2007/0298742 | A1* | 12/2007 | Ketchum ............. H04B 7/0643 |
| | | | 455/186.1 |

(Continued)

FOREIGN PATENT DOCUMENTS

| CN | 102315912 A | 1/2012 |
| CN | 102792605 A | 11/2012 |

(Continued)

OTHER PUBLICATIONS

Ron Porat et al., Parametric Compression of Rank-1 Analog Feedback in MIMO-OFDM, 2009 Conference Record of the Forty-Third Asilomar Conference on Signals, Systems and Computers, pp. 1402-1406, 2009.

(Continued)

*Primary Examiner* — Lan-Huong Truong
(74) *Attorney, Agent, or Firm* — Fay Sharpe LLP

(57) ABSTRACT

The present disclosure discloses a method for performing analog CSI feedback in a user equipment, comprising: a. obtaining an analog CSI matrix corresponding to the user equipment, the analog CSI matrix satisfies a condition below: $XX^H = D$, where X denotes the analog CSI matrix, H denotes conjugate transpose of matrix, and D denotes a diagonal matrix; b. obtaining dominated element information corresponding to the analog CSI matrix according to predetermined index information, and transmitting the dominated element information to a base station. The solution according to the present disclosure can reduce feedback overheads to a greater extent, has a high CSI feedback quality, and can reliably implement CSI recovery at the base station side.

8 Claims, 2 Drawing Sheets

(56) References Cited

U.S. PATENT DOCUMENTS

| | | | |
|---|---|---|---|
| 2008/0019457 A1 | 1/2008 | Waters et al. | |
| 2010/0322351 A1* | 12/2010 | Tang | H04B 7/066 |
| | | | 375/316 |
| 2011/0086654 A1* | 4/2011 | Larsson | H04B 7/0417 |
| | | | 455/501 |
| 2011/0216846 A1 | 9/2011 | Lee et al. | |
| 2012/0062421 A1* | 3/2012 | Su | H04B 7/0634 |
| | | | 342/373 |
| 2014/0098681 A1* | 4/2014 | Stager | H04W 24/02 |
| | | | 370/252 |
| 2016/0105230 A1 | 4/2016 | Sidiropoulos et al. | |
| 2017/0047974 A1* | 2/2017 | Vu | H04B 7/0465 |

FOREIGN PATENT DOCUMENTS

| | | | |
|---|---|---|---|
| CN | 103210592 A | 7/2013 | |
| CN | 103780268 A | 5/2014 | |

OTHER PUBLICATIONS

International Search Report for PCT/IB2017/000618 dated Oct. 12, 2017.

\* cited by examiner

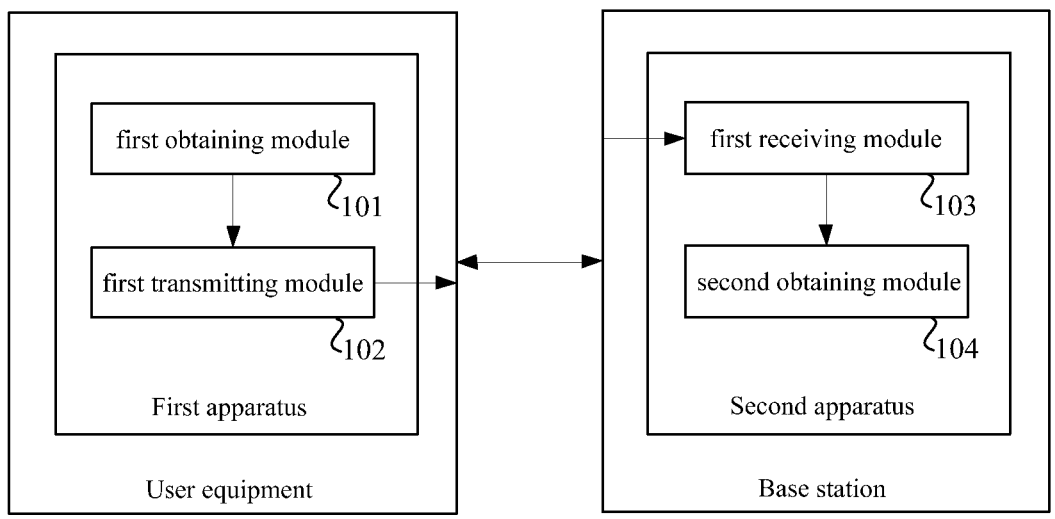
Fig. 3
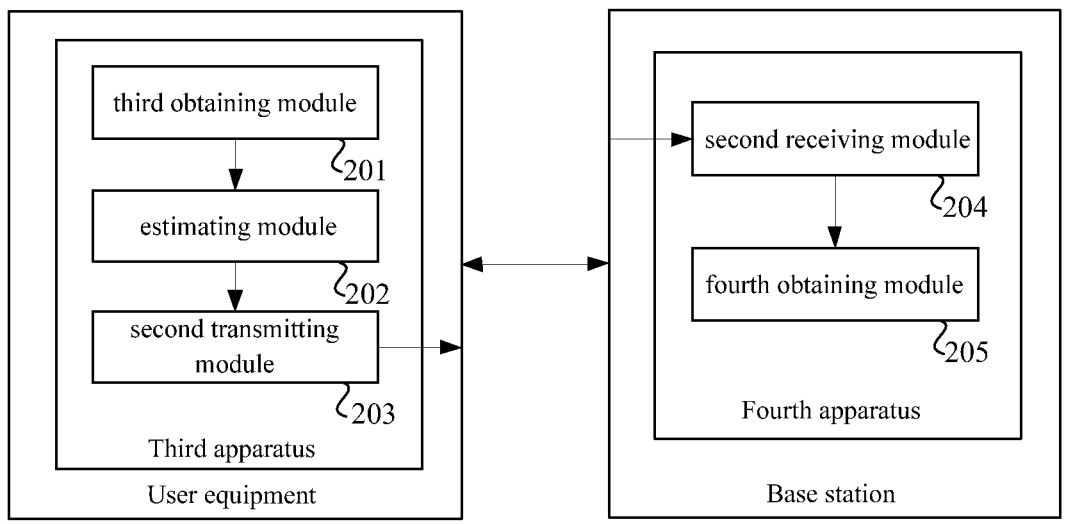
Fig. 4
$$\begin{bmatrix} \bigcirc & \bigcirc & \cdots & \cdots & \cdots & \bigcirc \\ \times & \bigcirc & \ddots & \ddots & \vdots & \bigcirc \\ \vdots & \ddots & \ddots & \ddots & \vdots & \vdots \\ \times & \cdots & \times & \bigcirc & \cdots & \bigcirc \end{bmatrix}$$
Fig. 5

METHODS, APPARATUSES, AND SYSTEMS FOR PERFORMING ANALOG CSI FEEDBACK

FIELD OF THE INVENTION

The present disclosure relates to the field of communication technologies, and more specifically, relates to methods, apparatuses, and systems for analog CSI feedback in a communication system.

BACKGROUND OF THE INVENTION

In the prior art, a base station may directly acquire CSI (Channel State Information) fed back from a UE (User Equipment). A CSI feedback scheme currently adopted in a practical system (e.g., LTE/LTE-A) is a codebook based limited feedback, which is a digital solution. However, for a 4G system, 5G system, and a more advanced communication system possibly evolving in the future, the digital solution has the following problems:

1) the design complexity for large antenna arrays (for example antenna arrays with 64, 128 or other number of ports) will become higher;
2) the larger the codebook size is, the higher the complexity of determining optimal codeword at UE side becomes;
3) effectiveness of the structured codebook depends on channel characteristics, e.g., channel correlation; therefore, the structured codebook may be inappropriate for CSI feedback based on equivalent channel such as using beamformed CSI-RS (Channel Status Information Reference Signal) defined in LTE R13;
4) the solution based on performance of the current codebook has SNR-dependent, namely, as the SNR increases, error floor will exist;
5) the efficiency of encoding/decoding cannot be satisfied due to limited resources of the uplink feedback channel, such that the solution above has a poor precision.

In view of the problems above, a concept of analog feedback is now proposed. The analog feedback allows a UE to only report an unquantized and uncoded version of downlink channel information. However, the prior art fails to provide a specific implementation solution for analog CSI feedback.

SUMMARY OF THE INVENTION

An objective of the present disclosure is to provide methods, apparatuses, and systems for analog CSI feedback in a communication system.

According to one aspect of the present disclosure, there is provided a method for performing analog CSI feedback in a user equipment, wherein the method comprises:

a. obtaining an analog CSI matrix corresponding to the user equipment, the analog CSI matrix satisfies a condition below:

$$XX^H = D$$

where X denotes the analog CSI matrix, H denotes conjugate transpose of matrix, and D denotes a diagonal matrix;

b. obtaining dominated element information corresponding to the analog CSI matrix according to predetermined index information, and transmitting the dominated element information to a base station.

According to another aspect of the present disclosure, there is provided a method for obtaining an analog CSI matrix corresponding to a user equipment in a base station, wherein the method comprises:

A. receiving dominated element information corresponding to an analog CSI matrix from the user equipment;

B. obtaining the analog CSI matrix according to predetermined index information and the dominated element information;

wherein the analog CSI matrix satisfies a condition below:

$$XX^H = D$$

where X denotes the analog CSI matrix, H denotes conjugate transpose of matrix, and D denotes a diagonal matrix.

According to a further aspect of the present disclosure, there is further provided a first apparatus for performing analog CSI feedback in a user equipment, wherein the first apparatus comprises:

a first obtaining module configured to obtain an analog CSI matrix corresponding to the user equipment, the analog CSI matrix satisfies a condition below:

$$XX^H = D$$

where X denotes the analog CSI matrix, H denotes conjugate transpose of matrix, and D denotes a diagonal matrix;

a first transmitting module configured to obtain dominated element information corresponding to the analog CSI matrix according to predetermined index information, and transmitting the dominated element information to a base station.

According to a still further aspect of the present disclosure, there is also provided a second apparatus for obtaining an analog CSI matrix corresponding to a user equipment in a base station, wherein the second apparatus comprises:

a first receiving module configured to receive dominated element information corresponding to an analog CSI matrix from the user equipment;

a second obtaining module configured to obtain the analog CSI matrix according to the dominated element information and predetermined index information;

wherein the analog CSI matrix satisfies a condition below:

$$XX^H = D$$

where X denotes the analog CSI matrix, H denotes conjugate transpose of matrix, and D denotes a diagonal matrix.

According to another aspect of the present disclosure, there is further provided a system for performing analog CSI feedback, wherein the system comprises a base station and a user equipment, the user equipment comprising the first apparatus of the present disclosure and the base station comprising the second apparatus of the present disclosure.

According to a further aspect of the present disclosure, there is also provided a method for performing analog CSI feedback in a user equipment, wherein the method comprises:

x. obtaining dominated basis vectors for subspace of channel statistics by decomposing a channel covariance matrix, and determining a first analog matrix corresponding to the user equipment according to the dominated basis vectors;

y. estimating a linear combination matrix corresponding to the first analog matrix according to a downlink reference signal from a base station;

z. transmitting the first analog matrix to the base station in a long term manner, and transmitting associated feedback information corresponding to the linear combination matrix to the base station in a short term manner.

According to another aspect of the present disclosure, there is further provided a method for obtaining CSI feedback information corresponding to a user equipment in a base station, wherein the method comprises:

receiving a first analog matrix transmitted by the user equipment to the base station in a long term manner, and associated feedback information corresponding to a linear combination matrix transmitted by the user equipment to the base station in a short term manner;

obtaining CSI feedback information corresponding to the user equipment according to the first analog matrix and the associated feedback information.

According to another aspect of the present disclosure, there is also provided a third apparatus for performing analog CSI feedback in a user equipment, wherein the third apparatus comprises:

a third obtaining module configured to obtain dominated basis vectors for subspace of channel statistics by decomposing a channel covariance matrix, and determine a first analog matrix corresponding to the user equipment according to the dominated basis vectors;

an estimating module configured to estimate a linear combination matrix corresponding to the first analog matrix according to a downlink reference signal from a base station; and a second transmitting module configured to transmit the first analog matrix to the base station in a long term manner, and transmit associated feedback information corresponding to the linear combination matrix to the base station in a short term manner.

According to a further aspect of the present disclosure, there is also provided a fourth apparatus for obtaining CSI feedback information corresponding to a user equipment in a base station, wherein the fourth apparatus comprises:

a second receiving module configured to receive a first analog matrix transmitted by the user equipment to the base station in a long term manner, and associated feedback information corresponding to a linear combination matrix transmitted by the user equipment to the base station in a short term manner; and a fourth obtaining module configured to obtain CSI feedback information corresponding to the user equipment according to the first analog matrix and the associated feedback information.

According to a still further aspect of the present disclosure, there is also provided a system for performing CSI feedback, wherein the system comprises a base station and a user equipment, the user equipment including the third apparatus of the present disclosure, and the base station including the fourth apparatus of the present disclosure.

Compared with the prior art, the present disclosure has the following advantages: feedback overheads can be reduced to a great extent by transmitting dominated element information corresponding to the analog CSI matrix to the base station; besides, a better CSI recovery quality can be achieved at the base station because of concentrating power at the dominated element information; moreover, feedback overheads can be further reduced by dividing the feedback process into two stages so as to transmit the dominated element information corresponding to the first analog matrix in a long term manner and transmit the dominated element information corresponding to the second analog matrix in a short term manner; in addition, because the analog CSI matrix satisfies the condition of $X X^H = D$, it may be directly used for further precoding and beamforming, thereby simplifying the implementation at the base station.

BRIEF DESCRIPTION OF THE ACCOMPANYING DRAWINGS

Other features, objectives, and advantages will become more apparent by reading detailed depictions of non-limiting embodiments with reference to the accompanying drawings.

FIG. 3 is a structural diagram of a system for performing analog CSI feedback according to an embodiment of the present disclosure;

FIG. 4 is a structural diagram showing a system for performing analog CSI feedback according to another embodiment of the present disclosure;

FIG. 5 is a schematic diagram of an analog CSI matrix according to an example of the present disclosure.

Figure 1:
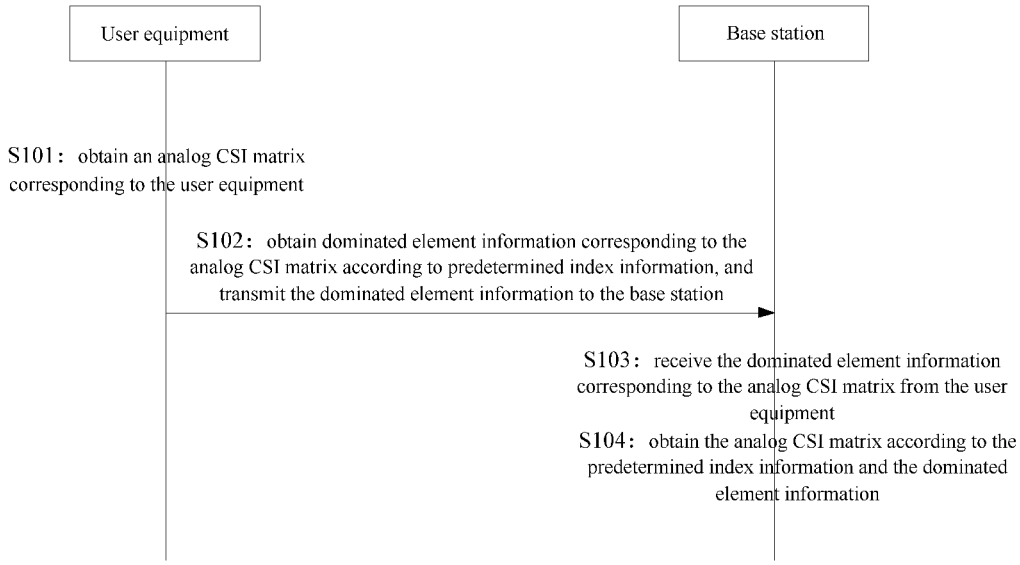
FIG. 1 is a flow diagram of a method for performing analog CSI feedback according to an embodiment of the present disclosure.

Same or similar reference documents in the drawings represent same or similar components.

DETAILED DESCRIPTION OF THE PREFERRED EMBODIMENTS

Although exemplary embodiments may have various modification and substitution manners, and some embodiments therein are illustrated exemplarily in the drawings and will be described in detail here, it should be understood that the exemplary embodiments are not intended to be limited to the specific forms as disclosed. On the contrary, the exemplary embodiments are intended to cover all modifications, equivalent schemes and alternative schemes falling within the scope of the claims. Same reference numerals always represent same units in depictions of respective drawings.

It should be noted before discussing the exemplary embodiments in more detail that some exemplary embodiments are described as processes or methods in the form of flow diagrams. Although a flow diagram depicts respective operations as being sequentially processed, many operations therein may be implemented in parallel, concurrently or simultaneously. Besides, Various operations may be re-ordered. When the operations are completed, the processing may be terminated. However, there may comprise additional steps not included in the accompanying drawings. The processing may correspond to a method, a function, a specification, a sub-routine, a sub-program, etc.

The term "wireless device" or "device" used here may be regarded as synonymous to the following items and sometimes may be referred to as the following items hereinafter: client, user equipment, mobile station, mobile user, mobile terminal, subscriber, user, remote station, access terminal, receiver, and mobile unit, etc., and may describe a remote user of a wireless resource in a wireless communication network.

Similarly, the term "base station" used herein may be regarded synonymous to the following items and may sometimes be referred to as the following items hereinafter: node B, evolved node B, eNodeB, transceiver base station (BTS), RNC, etc., and may describe a transceiver communicating with a mobile station and provide radio resources in radio communication networks across a plurality of technical generations. Besides the capability of implementing the method discussed here, the base station in discussion may have all functions associated with traditional well-known base stations.

The method discussed infra (some of which are illustrated through flow diagrams) may generally be implemented through hardware, software, firmware, middleware, microcode, hardware description language or any combination thereof. When it is implemented with software, firmware, middleware or microcode, the program code or code segment for executing necessary tasks may be stored in a machine or a computer readable medium (e.g., storage medium). (One or more) Processors may implement the necessary tasks.

The specific structures and function details disclosed here are only representative, for a purpose of describing the exemplary embodiments of the present disclosure. Instead, the present disclosure may be specifically implemented through many alternative embodiments. Therefore, it should not be appreciated that the present disclosure is only limited to the embodiments illustrated here.

It should be understood that although terms like "first" and "second" might be used here to describe respective units, these units should not be limited by these terms. Use of these terms is only for distinguishing one unit from another. For example, without departing from the scope of the exemplary embodiments, a first unit may be referred to as a second unit, and similarly the second unit may be referred to as the first unit. The term "and/or" used here includes any and all combinations of one or more associated items as listed.

It should be understood that when one unit is "connected" or "coupled" to a further unit, it may be directly connected or coupled to the further unit, or an intermediate unit may exist. In contrast, when a unit is "directly connected" or "directly coupled" to a further unit, an intermediate unit does not exist. Other terms (e.g., "disposed between" VS. "directly disposed between," "adjacent to" VS "immediately adjacent to," and the like) for describing a relationship between units should be interpreted in a similar manner.

The terms used here are only for describing preferred embodiments, not intended to limit exemplary embodiments. Unless otherwise indicated, singular forms "a" or "one" used here are also intended to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

Unless otherwise defined, all terms (including technical and scientific terms) used herein have the same meanings as generally understood by those skilled in the art to which the exemplary embodiments relate. It should also be understood that unless explicitly defined here, those terms defined in common dictionaries should be construed to having meanings consistent with those in the context of a related art, and should not be construed according to ideal or too formal meanings.

Some parts of the exemplary embodiments and corresponding detailed depictions are provided through software or algorithms within a computer memory and symbol representations for operating data bits. These depictions and representations are depictions and representations used by a person skilled in the art to effectively convey the essence of his/her work to other technical persons in the art. As usually used, the term "algorithm" used here is envisaged a sequence of inherently consistent steps for obtaining a desired result. The steps refer to those steps that need physical manipulation of physical quantities. Generally, but not necessarily, these quantities adopt forms of optical, electric or magnetic signals that can be stored, transmitted, combined, compared and otherwise manipulated. Mainly for the sake of common use, it has been proved that it is sometimes convenient to refer to these signals as bits, numerical values, elements, symbols, characters, items, and digits.

In the depictions infra, illustrative embodiments may be described with reference to symbol representations (e.g., in the form of flow diagrams) of actions and operations that may be implemented as program modules or function processing. The program modules or function processing include routines, programs, objects, components, and data structures and the like which implement specific tasks or implement specific abstract data types, and may be implemented using existing hardware at existing network elements. Such existing hardware may include one or more central processing units (CPUs), digital signal processors (DSPs), specific integrated circuits, field programmable gate array (FPGA) computers, etc.

However, it should be aware that all of these and similar terms should be associated with appropriate physical quantities and are only employed as convenient tags for these quantities. Unless explicitly stated otherwise or clearly seen from the discussion, terms such as "processing," "computing," "determining" or "displaying" refer to actions and processing of a computer system or a similar electronic computing device, which manipulates data represented as physical and electronic quantities in a register or memory of the computer system, and such data are transformed into other data similarly represented as physical quantities in the computer system memory or register or other devices for storing, delivering or displaying such kind of information.

It should also be noted that software-implemented aspects of the exemplary embodiments are generally encoded on a program storage medium of a certain form or implemented through a certain type of transmission mediums. The program storage medium may be a magnetic (e.g., a floppy disk or hard disk driver) or optical (e.g., CD ROM) storage medium, and may be a read-only or random access storage medium. Similarly, the transmission medium may be a twisted pair, co-axial cable, optical fiber or certain other appropriate transmission medium well known in the art. The exemplary embodiments are not limited by these aspects in any given implementation manner.

The processor and the memory may jointly operate to run apparatus functions. For example, the memory may store code segments regarding the apparatus functions, while the code segments may also be executed by the processor. Besides, the memory may store processing variables and constants available for the processor.

Hereinafter, the present disclosure will be described in further details with reference to the accompanying drawings.

FIG. 1 is a flow diagram of a method for performing analog CSI feedback according to an embodiment of the present disclosure.

The method of the present embodiment is mainly implemented by a base station and a user equipment in a communication system. Preferably, the communication system is a 4G, 5G or a system upgraded later. Particularly, the user equipment includes, but not limited to, a tablet computer, a smart phone, a PDA, or any other user equipment capable of communicating with the base station. It should be noted that the base station, user equipment and communication system are only examples, and other existing or future possibly emerging base stations, user equipments, and communication systems, if applicable to the present disclosure, should also be included within the protection scope of the present disclosure and are incorporated here by reference.

The method according to the present embodiment includes step S101, step S102, step S103, and step S104.

In step S101, the user equipment obtains an analog CSI matrix corresponding to the user equipment.

Wherein, the analog CSI matrix satisfies the following condition:

$$XX^H = D \quad (1)$$

Where X denotes a R*K analog CSI matrix, R≤K, the symbol "H" denotes conjugate transpose of matrix, D denotes a diagonal matrix, wherein elements on the diagonals of the diagonal matrix D may be identical or different.

Hereinafter, the step S101 will be further illustrated using the two preferred schemes.

Scheme 1:

The analog CSI matrix includes a third analog matrix corresponding to an estimation channel matrix, and the step S101 further comprises: performing, by a user equipment, SVD (Singular Value Decomposition) to the estimation channel matrix estimated by the user equipment to obtain corresponding dominated singular values and dominated right singular vectors, and obtaining the third analog matrix according to the dominated singular values and the dominated right singular vectors.

Herein, the dominated singular values refer to singular values that play a dominated role among the singular values obtained by performing the SVD, and the dominated right singular vectors refer to the right singular vectors that play a dominated role among the right singular vectors obtained by performing the SVD.

Assuming that the base station has M antennas and UE has N antennas, based on a downlink reference signal from the base station, the UE may estimate a N*M downlink estimation channel matrix, denoted as A; by performing SVD to A, the following may be derived:

$$A = USV^H \quad (2)$$

where the left singular vector U is a N*J matrix and satisfies $U^H U = E$; the singular value S is a J*J diagonal matrix; the right singular vector V is a M*J matrix and satisfies $V^H V = E$; J is rank of A, and E is a unit matrix. V is used by the base station to perform beamforming or interference mitigation among different layers/UEs, U is used by the UE to perform beamforming or residual interference mitigation, while S is used for power allocation among a plurality of streams so as to maximize link capacity, therefore, only the matrices S and V are needed by the base station. It is further considered that in actuality, S is usually controlled only by a small portion of dominated diagonals; then if the number of these dominated diagonals I<J, it may be expressed below:

$$A \approx \tilde{U}\tilde{S}\tilde{V}^H \quad (3)$$

where the dominated left singular vectors $\tilde{U}$ is a N*I matrix, indicating left singular vectors that play a dominated role in U; the dominated singular values $\tilde{S}$ is an I*I matrix, indicating diagonals that play a dominated role in S; the dominated right singular vectors $\tilde{V}$ is a M*I matrix, indicating right singular vectors that play a dominated role in V. Therefore, the third analog matrix B may be represented as:

$$B = \tilde{S}\tilde{V}^H \quad (4)$$

where B is an I*M matrix.

Scheme 2:

The analog CSI matrix includes a first analog matrix that needs to be transmitted to the base station in a long term manner and a second analog matrix that needs to be transmitted to the base station in a short term manner, and the step S101 further comprises step S1011 and step S1012.

In step S1011, the user equipment obtains dominated basis vectors for the subspace of channel statistics by decomposing channel covariance matrix, and determines the first analog matrix based on the dominated basis vectors.

Herein, the dominated basis vectors are for indicating basis vectors that play a dominated role in the space. Herein, the first analog matrix is a combined matrix of the resulting basis vectors.

The present disclosure exploits the fact that the practical scattering geometry often makes that angle of departure of channel path at base station is limited spread. This results in a highly correlated channel. In actuality, the channel covariance matrix can be expressed as:

$$F = E(A^H A) \approx \sum_{i=1}^{L} \lambda_i g_i g_i^H \quad (5)$$

where F denotes a covariance matrix, $E(A^H A)$ denotes a desired value of $A^H A$, $g_i$ denotes M*1 dominated basis vectors, L<M (M is the number of antennas of the base station), $\lambda_i$ is a coefficient corresponding to $g_i$. Further, based on the equation (5), it may be derived:

$$A \approx C[g_1 \ldots g_L]^H \quad (6)$$

where C is a linear combination matrix. The first analog matrix may be expressed as:

$$G = [g_1 \ldots g_L] \quad (7)$$

It should be noted that because the basis vectors of subspace are mainly determined by a spatial angle of multipath, which usually changes slowly. Therefore, the first analog matrix resulting from combining the dominated basis vectors can be transmitted to the base station in a long term manner. Compared with the dominated basis vectors, elements in the linear combination matrix change faster according to Doppler spread. Therefore, the second analog matrix obtained later according to the linear combination matrix needs to be transmitted to the base station in a short term manner.

In step S1012, the user equipment estimates a linear combination matrix corresponding to the first analog matrix according to a downlink reference signal from the base station, performs singular value decomposition to the linear combination matrix to obtain corresponding dominated singular values and dominated right singular vectors, and obtains the second analog matrix according to the dominated singular values and the dominated right singular vectors.

Herein, the downlink reference signal includes, but not limited to: a beamformed CSI-RS signal, a non-precoded CSI-RS signal, etc. If the downlink reference signal is a beamformed CSI-RS signal (using $g_1, g_2, \ldots, g_L$ as the beamformer), the user equipment may estimate C as an equivalent channel matrix. If the downlink reference signal is a non-precoded CSI-RS signal, the user equipment may estimate C by considering the signal subspace spanned by G.

Herein, the elements in the linear combination matrix may be regarded as coefficients of the dominated basis vectors.

Specifically, the user equipment estimates the linear combination matrix C corresponding to the first analog matrix according to the downlink reference signal from the base station, and performs singular value decomposition to C to obtain corresponding dominated singular values and dominated right singular vectors based on the equation below:

$$C=U'S'V'^H \approx \tilde{U}'\tilde{S}'\tilde{V}'^H \quad (8)$$

where U', S', V' denote left singular vectors, singular values, right singular vectors resulting from performing SVD to C, respectively, $\tilde{U}'$, $\tilde{S}'$, $\tilde{V}'$ denote dominated left singular vectors of N*I', dominated singular values of I'*I', and dominated right singular vectors of I'*L' respectively, and I' is the number of dominated diagonals. Then, the second analog matrix B' corresponding to C may be expressed as:

$$B'=\tilde{S}'\tilde{V}'^H \quad (9)$$

where B' is an I'*L matrix.

It needs to be noted that operations of steps S1011 and S1012 are applicable to any antenna array.

Besides, as another preferred solution of the present embodiment, long-term feedback load size can be further reduced and feedback precision can be increased in a scenario of adopting a cross-polarized antenna array.

In the preferred solution, the step S1011 further comprises: averaging, by the user equipment, channel covariance matrices in two polarized directions, obtaining dominated basis vectors for the subspace of channel statistics by decomposing the matrix resulting from performing the averaging, and determining a first analog matrix corresponding to the user equipment according to the dominated basis vectors; the step S1012 further comprises: estimating, by the user equipment, two linear combination matrices corresponding to the two polarized directions according to the downlink reference signal from the base station, respectively, merging the two linear combination matrices, and performing singular value decomposition to the merged matrix to obtain corresponding dominated singular values and dominated right singular vectors, and obtaining a second analog matrix corresponding to the user equipment according to the dominated singular values and the dominated singular vectors.

Specifically, the user equipment averages the channel covariance matrices in two polarized directions, and obtains the following dominated basis vectors by decomposing the matrix resulting from performing the averaging: $\bar{g}_1, \ldots$ $\bar{g}_j, \ldots, \bar{g}_{L'}$, j=1, ..., L', L'<M, where $\bar{g}_j$ denotes basis vectors of (M/2)*1; then, the user equipment may determine the first analog matrix $\bar{G}$:

$$\bar{G}=[\bar{g}_1 \ldots \bar{g}_{L'}] \quad (10)$$

The user equipment estimates two linear combination matrices C1 and C2 corresponding to the two polarized directions according to the downlink reference signal from the base station, respectively, and merges C1 and C2 into C', and then performs singular value decomposition to C' based on the equation below, thereby obtaining the dominated singular values $\bar{\bar{S}}'$ and the dominated right singular vectors $\bar{\bar{V}}'$:

$$C'=\bar{\bar{U}}'\bar{\bar{S}}'\bar{\bar{V}}'^H \quad (11)$$

where $\bar{\bar{U}}'$ denotes dominated singular vectors; afterwards, the user equipment may obtain a second analog matrix $\bar{B}'$ based on the equation below:

$$\bar{B}'=\bar{\bar{S}}'\bar{\bar{V}}'^H \quad (12)$$

It needs to be noted that the example above is only for better illustrating the technical solution of the present disclosure, not for limiting the present disclosure. Those skilled in the art should understand that any implementation manner of obtaining an analog CSI matrix corresponding to the user equipment should be included within the scope of the present disclosure.

In step S102, the user equipment obtains dominated element information corresponding to the analog CSI matrix according to predetermined index information, and transmits the dominated element information to the base station.

Herein, the predetermined index information is pre-stored in the base station and the user equipment; the predetermined index information includes any predetermined index information that can indicate respective elements which need to be transmitted to the base station (or do not need to be transmitted to the base station), e.g., indexes of respective elements that need to be transmitted to the base station in the matrix, indexes of respective elements that do not need to be transmitted to the base station in the matrix, etc. It needs to be noted that for a R*K matrix, the total number of elements that do not need to be transmitted to the base station is R(R−1)/2 (i.e., the total number of elements that need to be transmitted to the base station is (2K−R+1) R/2). Such elements that do not need to be transmitted to the base station are located in (R−1) rows of the matrix, and the numbers of elements that do not need to be transmitted to the base station in each of the (R−1) rows are different.

It needs to be noted that if the indexes of the elements that do not need to be transmitted to the base station, as indicated by the predetermined index information, are represented as: $(a_1, b_{1,1}), (a_2, b_{2,1}), (a_2, b_{2,2}), \ldots, (a_{R-1}, b_{R-1,1}), \ldots, (a_{R-1}, b_{R-1,R-1})$, the following conditions should be satisfied:

$$a_m \neq a_n, \forall m \neq n$$

$$b_{m,n} \neq b_{m,k}, \forall n \neq k, \forall m$$

wherein, $a_m$ denotes the row having m elements that do not need to be transmitted to the base station, $1 \leq m \leq R-1$, $b_{m,n}$ denotes the column where the $n^{th}$ element that does not need to be transmitted to the base station in the row $a_m$, $1 \leq n \leq m$.

As an example, the R*K analog CSI matrix is shown in FIG. 5, wherein "x" denotes the elements that do not need to be transmitted to the base station, "○" denotes the elements that need to be transmitted to the base station, and the predetermined index information includes indexes corresponding to all "x" Moreover, it may be seen from FIG. 5 that only all elements in the first row need to be transmitted to the base station, 1 element in the $2^{nd}$ row does not need to be transmitted, 2 elements in the $3^{rd}$ row do not need to be transmitted, and so on; in the $R^{th}$ row, R−1 elements do not need to be transmitted.

Herein, the dominated element information corresponding to the analog CSI matrix includes, but not limited to: dominated element information in the analog CSI matrix, dominated element information in other matrices obtained based on the analog CSI matrix, etc. The dominated element information is for indicating elements that play a dominated role in a corresponding matrix.

Specifically, the implementation manner, in which the user equipment extracts dominated element information in the analog CSI matrix according to the predetermined index information, and transmits the dominated element information to the base station, includes, but not limited to:

1) the step S102 includes step S1021. In the step S1021, the user equipment extracts dominated element information in the analog CSI matrix according to the predetermined index information, and transmits the dominated element information to the base station.

As an example, a R*K analog CSI matrix is shown in FIG. 5, predetermined index information includes indexes of the elements that do not need to be transmitted to the base station as following: $(a_1, b_{1,1}), (a_2, b_{2,1}), (a_2, b_{2,2}), \ldots, (a_{R-1}, b_{R-1,1}), \ldots, (a_{R-1}, b_{R-1,R-1})$; the indexes are for "x" in the analog CSI matrix. In step S1021, the user equipment extracts all elements corresponding to "○" in the analog CSI matrix according to the predetermined index information, and transmits the extracted elements as dominated element information to the base station.

Preferably, the step S1021 further comprises: permutating, by the user equipment, rows of the analog CSI matrix according to permutation matrix; next, extracting, by the user equipment, dominated element information in the permutated matrix according to the predetermined index information, and transmitting the dominated element information to the base station.

Specifically, the user equipment permutates rows of the analog CSI matrix X based on the equation below:

$$X_p = PX \quad (13)$$

Wherein, P denotes a R*R permutation matrix and $X_p$ denotes a permutated matrix. Next, the user equipment extracts dominated element information in the permutated matrix according to the predetermined index information, and transmits the dominated element information to the base station. Particularly, the implementation manner, in which the user equipment extracts dominated element information in the permutated matrix according to the predetermined index information and transmits the dominated element information to the base station, is similar to the implementation manner of the step S1021, which is thus not detailed here.

It should be noted that $X_p$ selected by the user equipment when performing the transmitting operation, i.e., the selected permutation matrix P, needs to be determined by the equation below:

$$\min_{P \in Y} \sum_{(a,b) \in Z} |X_p(a,b)|^2 \quad (14)$$

where Y denotes a set of all predetermined permutation matrices, min denotes a minimal value function, $Z = \{(a_1, b_{1,1}), (a_2, b_{2,1}), (a_2, b_{2,2}), \ldots, (a_{R-1}, b_{R-1,1}), \ldots, (a_{R-1}, b_{R-1,R-1})\}$. The present preferred solution can make the power of unsent elements as small as possible, namely, make the power of elements transmitted to the base station as large as possible, such that the base station can estimate the (2K−R+1) R/2 elements transmitted to the base station more reliably, so as to recover the R(R−1)/2 elements unsent to the base station more reliably based on the elements transmitted to the base station.

2) the step S102 comprises step S1022 and S1023. In step S1022, the user equipment obtains a transformation matrix corresponding to the analog CSI matrix according to the predetermined index information, and transform the analog CSI matrix based on the transformation matrix. In step S1023, the user equipment extracts all non-zero elements in the transformed matrix, and transmits the non-zero elements as dominated element information corresponding to the analog CSI matrix to the base station, wherein the transformation matrix is an orthogonal matrix.

Specifically, the predetermined index information indicates the following indexes corresponding to the elements that do not need to be transmitted to the base station: $(a_1, b_{1,1}), (a_2, b_{2,1}), (a_2, b_{2,2}), \ldots (a_{R-1}, b_{R-1,1}), \ldots, (a_{R-1}, b_{R-1,R-1})$. In step S1022, the user equipment first calculates a basis vector $s_1$ for the orthogonal complementary space of the space spanned according to the $b_{R-1,1}{}^{th}$ to $b_{R-1,R-1}{}^{th}$ column vectors in X, and uses the conjugate transpose $s_1{}^H$ of $s_1$ as the $a_{R-1}{}^{th}$ row vector of the transformation matrix W; next, calculates a basis vector $s_2$ for the orthogonal complementary space of the space spanned according to the $b_{R-2,1}{}^{th}$ to $b_{R-2,R-2}{}^{th}$ column vectors in X and $s_1$, and let the conjugate transpose $s_2{}^H$ of $s_2$ be the $a_{R-2}{}^{th}$ row vector of the transformation matrix W; and so on, till all row vectors of W are obtained. Then the user equipment obtains the matrix $\tilde{X}$ resulting from transforming X based on the equation below:

$$\tilde{X} = WX \quad (15)$$

In $\tilde{X}$, the elements corresponding to the abovementioned indexes are zero elements. Afterwards, in step S1023, the user equipment extracts all non-zero elements in $\tilde{X}$, and transmits the non-zero elements as dominated element information corresponding to the analog CSI matrix to the base station.

As an example, the user equipment may obtain $\tilde{X}$ similar to the matrix structure shown in FIG. 5 by performing QR decomposition to the submatrix of X and obtaining the transformation matrix W in conjunction with the predetermined index information; when FIG. 5 is regarded as $\tilde{X}$, the "x" therein indicates zero element. Herein, X is split into $X_1$ and $X_2$, $X_1$ being a R*R submatrix; then $X_1$ may be subjected to QR decomposition to obtain an upper triangle matrix that is transposed into the transformation matrix W.

Compared with implementation manner 1), although the number of elements that need to be fed back are identical, implementation manner 2) has the following advantages: a) because power is concentrated on (2K−R+1) R/2 transmission symbols, the CSI estimation SINR is better than the implementation manner 1); b) because all channel coefficients are estimated independently, there is no estimation error propagation effect. Therefore, implementation manner 2) has a higher CSI feedback quality.

As another preferred solution of step S102, when the analog CSI matrix includes a first analog matrix that needs to be transmitted to the base station in a long term manner and a second analog matrix that needs to be transmitted to the base station in a short term manner, the user equipment obtains the dominated element information corresponding to the first analog matrix according to the predetermined index information and transmits the dominated element information corresponding to the first analog matrix to the base station in a long term manner; and obtains the dominated element information corresponding to the second analog matrix according to the predetermined index information and transmits the dominated element information corresponding to the second analog matrix to the base station in a short term manner.

It needs to be noted that the long term manner means the user equipment performs corresponding transmitting operation in a relatively long term, while the short term manner means the user equipment performs corresponding transmitting operation in a relatively short term. Those skilled in the art should understand that there is no strict sequential relationship between the operation of obtaining the first analog matrix and the operation of obtaining the second analog matrix, and there is likewise no strict sequential relationship between the operation of transmitting the dominated element information corresponding to the first analog matrix and the operation of transmitting the dominated element information corresponding to the second analog matrix. For example, the user equipment performs the operation of obtaining the first analog matrix every time t1, and meanwhile transmits the dominated element information corresponding to the first analog matrix; moreover, the user equipment performs the operation of obtaining the second analog matrix every time t2, and meanwhile transmits the dominated element information corresponding to the second analog matrix, wherein t1>t2.

By combining the long term manner and the short term manner to implement analog CSI feedback, the preferred solution can utilize the feedback channel more effectively and decrease feedback load to a greater extent.

It needs to be noted that the example above is only for better illustrating the technical solution of the present disclosure, not for limiting the present disclosure. Those skilled in the art should understand that any implementation manner of obtaining the dominated element information corresponding to the analog CSI matrix according to the predetermined index information and transmitting the dominated element information to the base station should be included in the scope of the present disclosure.

In step S103, the base station receives the dominated element information corresponding to the analog CSI matrix from the user equipment.

In step S104, the base station obtains the analog CSI matrix according to the predetermined index information and the dominated element information.

As a preferred solution, the dominated element information is extracted from the analog CSI matrix, and the base station calculates other elements in the analog CSI matrix except the dominated element information according to the predetermined index information and the dominated element information, thereby obtaining the analog CSI matrix.

It needs to be noted that X is denoted as $X=[x_1^T \ldots x_r^T \ldots x_R^T]^T$, $r=1,\ldots,R$, wherein the symbol "T" denotes transposition of matrix; then based on the above equation (1), it is seen that X satisfies the following equation:

$$x_{r+1} X(1:r,:)^H = 0_{1*r} \quad (16)$$

where $x_{r+1}$ denotes the $r+1^{th}$ row of X, and X(1:r,:) denotes the $1^{st}$ row to the $r^{th}$ row of X. The following may be further obtained:

$$X(1:r,1:r)^* x_{r+1}(1:r)^T = -X(1:r,r+1:K)^* x_{r+1}(r+1:K)^T \quad (17)$$

where X(1:r,1:r) consists of the $1^{st}$ to $r^{th}$ row and the $1^{st}$ to $r^{th}$ column of X, $x_{r+1}(1:r)$ consists of the $1^{st}$ to $r^{th}$ elements in the $r+1^{th}$ row, and the "*" in the upper right corner denotes conjugate. It is seen from equation (17) that if X(1:r,:) and $x_{r+1}(r+1:K)$ are known, then $x_{r+1}(1:r)$ may be derived through calculation.

As an example, in step S103, the base station receives dominated element information from the user equipment, the dominated element information including all elements where "○" is located in FIG. 5; in step S104, the base station determines indexes of elements unsent to the base station based on the predetermined index information, and recovers the elements unsent to the base station based on the equation below:

$$X(1,1)^* \underline{x_2(1)} = -X(1,2:K)^* x_2(2:K)^T \quad (18)$$

$$X(1:2,1:2)^* \underline{x_3(1:2)}^T = -X(1:2,3:K)^* x_3(3:K)^T \quad (19)$$

$$\vdots$$

$$X(1:R-1,1:R-1)^* \underline{x_R(1:R-1)}^T = -X(1:R-1,R:K)^* x_{r+1}(R:K)^T \quad (20)$$

Wherein the underlined part indicates that the matrix is unknown. Namely, for the analog CSI matrix shown in FIG. 5, the base station first recovers the first element $x_2(1)$ in the second row according to the known first row vector X(1,:) and $x_2(2:K)$; next, the base station obtains all elements of X(1:2,), and recovers $x_3(1:2)$ according to X(1:2,) and the known $x_3(3:K)$, and so on, till all elements at "x" in FIG. 5 are recovered.

It needs to be noted that when the dominated element information is extracted from the $X_p$, then after the base station recovers the $X_p$ based on the preferred solution, the $X_p$ may be directly regarded as the analog CSI matrix corresponding to the user equipment.

As another preferred solution, the dominated element information includes all non-zero elements in the matrix resulting from transforming the analog CSI matrix; the base station determines the matrix resulting from transformation of the analog CSI according to the predetermined index information and the dominated element information, wherein other elements in the transformed matrix except the dominated element information are zero; afterwards, the base station performs singular value decomposition to the transformed matrix to obtain singular values and right singular vectors corresponding to the transformed matrix, and then obtains the analog CSI matrix according to the singular values and the right singular vectors.

Particularly, the base station sets all elements unsent to the base station to zero according to the predetermined index information, thereby obtaining the matrix $\tilde{X}$ resulting from transformation of X.

It is noted that based on equation (1), it may be found that X can be expressed into:

$$X = D^{1/2} Q \quad (21)$$

Wherein, Q is an orthogonal array; because D is a diagonal matrix, it may be found based on equation (21) and equation (15) that $WD^{1/2}Q$ is just the SVD of $\tilde{X}$; then, SVD is performed to $\tilde{X}$:

$$\tilde{X} = \tilde{U}'' \tilde{S}'' \tilde{V}''^H \quad (22)$$

where $\tilde{U}''$, $\tilde{S}''$, $\tilde{V}''$ denote the left singular vectors, singular values, right singular vectors obtained by performing SVD, respectively; therefore, the following may be obtained:

$$X = \tilde{S}'' \tilde{V}''^H \quad (23)$$

Preferably, when the analog CSI matrix includes the first analog matrix transmitted to the base station in a long term manner and the second analog matrix transmitted to the base station in a short term manner, the method further comprises: the base station obtains a third analog matrix corresponding to the user equipment based on the first analog matrix and the second analog matrix.

For example, the analog CSI matrix includes the first analog matrix G and the second analog matrix B', and the base station can obtain the third analog matrix B based on the equation below:

$$B = B' G^H \quad (24)$$

For another example, in a scenario in which the base station adopts cross-polarized antenna array, the analog CSI matrix includes the first analog matrix $\overline{G}$ and the second analog matrix $\overline{B}'$; the base station may obtain the third analog matrix B based on the equation below:

$$B = \overline{B}' \begin{bmatrix} \overline{G}^H & 0 \\ 0 & \overline{G}^H \end{bmatrix} \quad (25)$$

It needs to be noted that the example above is only for better illustrating the technical solution of the present disclosure, rather than limiting the present disclosure. Those skilled in the art should understand that any implementation manner of obtaining the analog CSI matrix according to the predetermined index information and the dominated element information should be included within the scope of the present disclosure.

Although the analog feedback currently proposed might be a simple concept, it also faces many problems in practical applications, e.g., a) for large antenna array, the overheads of analog feedback may be very large; b) how to ensure that the base station can recover the CSI as much as possible.

According to the solution of the present embodiment, feedback overheads can be reduced to a great extent by transmitting the dominated element information corresponding to the analog CSI matrix to the base station, and a better CSI recovery quality can be implemented at the base station because of concentrating power at the dominated element information; moreover, feedback overheads can be further reduced by dividing the feedback process into two stages so as to transmit the dominated element information corresponding to the first analog matrix in a long term manner and transmit the dominated element information corresponding to the second analog matrix in a short term manner; in addition, because the analog CSI matrix satisfies the condition of $X X^H = D$, it may be directly used for further precoding and beamforming, thereby simplifying the implementation at the base station.

Figure 2:
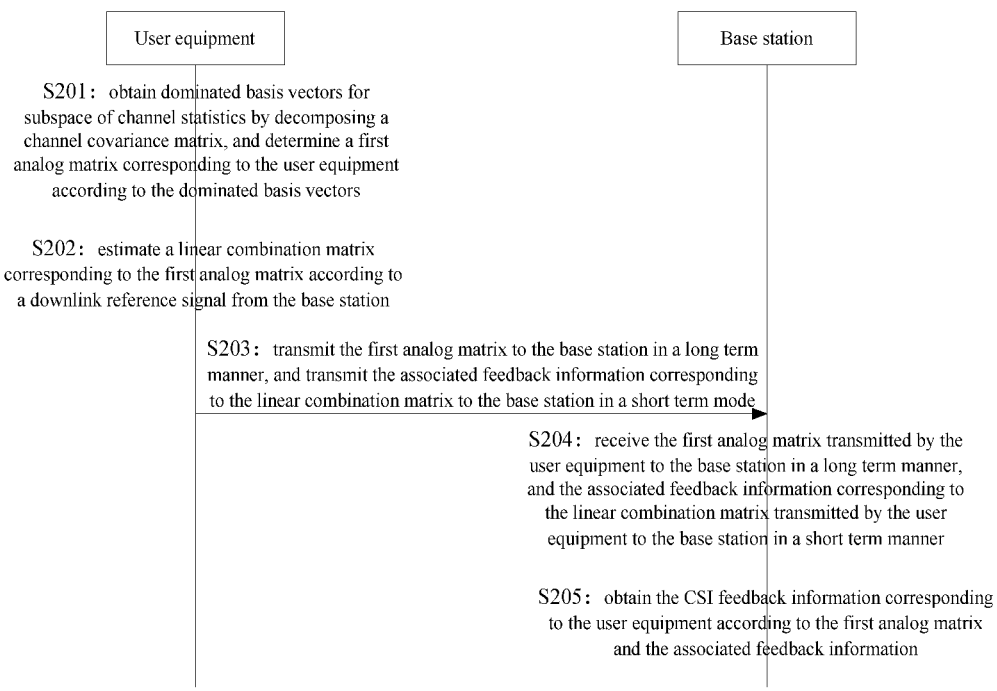
FIG. 2 is a flow diagram of a method for performing analog CSI feedback according to another embodiment of the present disclosure.

FIG. 2 is a flow diagram of a method for performing analog CSI feedback according to another embodiment of the present disclosure. The method according to the present embodiment comprises step S201, step S202, step S203, step S204, and step S205.

In step S201, the user equipment obtains dominated basis vectors for subspace of channel statistics by decomposing a channel covariance matrix, and determines a first analog matrix corresponding to the user equipment based on the dominated basis vectors.

Particularly, the implementation manner of step S201 is identical or similar to the implementation manner of the aforementioned step S1011, which is thus not detailed here.

In step S202, the user equipment estimates a linear combination matrix corresponding to the first analog matrix according to a downlink reference signal from the base station.

Particularly, the implementation manner, in which the user equipment estimates the linear combination matrix corresponding to the first analog matrix according to the downlink reference signal from the base station, has been discussed in detail in the aforementioned embodiments, which is thus not detailed here.

In step S203, the user equipment transmits the first analog matrix to a base station in a long term manner, and transmits associated feedback information corresponding to the linear combination matrix to the base station in a short term manner.

Particularly, the associated feedback information includes any information that is determined based on the linear combination matrix and needs to be transmitted to the base station in a short term manner.

For example, the user equipment directly uses the linear combination matrix C as the associated feedback information, and the user equipment transmits a first analog matrix G to the base station in a long term manner, and transmits C to the base station in a short term manner.

As a preferred solution, the step S203 further comprises: performing, by the user equipment, singular value decomposition to the linear combination matrix to obtain corresponding dominated singular values and dominated right singular vectors, and obtaining a second analog matrix corresponding to the linear combination matrix according to the dominated singular values and the dominated singular vectors; transmitting, by the user equipment, the first analog matrix to the base station in a long term manner, and transmitting the second analog matrix as the associated feedback information to the base station in a short term manner.

Particularly, the implementation manner in which the user equipment obtains the second analog matrix has been described in detail in the aforementioned embodiments, which is thus not detailed here.

For example, the user equipment transmits the first analog matrix G to the base station in a long term manner, and transmits the second analog matrix B' to the base station in a short term manner.

It needs to be noted that preferably, in a scenario in which the base station adopts cross-polarized antenna array, the first analog matrix is the abovementioned $\overline{G}$, the associated feedback information is the abovementioned $\overline{B}'$, and the user equipment transmits $\overline{G}$ to the base station in a long term manner and transmits $\overline{B}'$ to the base station in a short term manner.

Compared with the scheme of directly using the linear combination matrix as associated feedback information, the preferred solution can further save the amount of feedback symbols.

It needs to be noted that the example above is only for better illustrating the technical solution of the present disclosure, not for limiting the present disclosure. Those skilled in the art should understand that any implementation manner, in which the user equipment transmits the first analog matrix to the base station in a long term manner and transmits the associated feedback information corresponding to the linear combination matrix to the base station, should be included within the scope of the present disclosure.

In step S204, the base station receives the first analog matrix transmitted by the user equipment to the base station in a long term manner, and the associated feedback information corresponding to the linear combination matrix which is transmitted by the user equipment to the base station in a short term manner.

In step S205, the base station obtains the CSI feedback information corresponding to the user equipment according to the first analog matrix and the associated feedback information.

For example, the base station obtains an approximate A according to the received first analog matrix G and linear combination matrix C in conjunction with equation (6).

Preferably, the associated feedback information is the second analog matrix corresponding to the user equipment.

For example, the base station obtains a third analog matrix B corresponding to the user equipment according to the received first analog matrix G and the second analog matrix B' in conjunction with the equation (24).

For another example, in a scenario in which the base station adopts cross-polarized antenna array, the base station obtains the third analog matrix B corresponding to the user equipment according to the received first analog matrix $\overline{G}$ and second analog matrix $\overline{B}'$ in conjunction with the equation (25).

It needs to be noted that the example above is only for better illustrating the technical solution of the present disclosure, not for limiting the present disclosure. Those skilled in the art should understand that any implementation manner in which the base station obtains the CSI feedback information corresponding to the user equipment according to the first analog matrix and the associated feedback information should be included within the scope of the present disclosure.

Compared with the scheme of directly transmitting the estimation channel matrix in the prior art, the present embodiment can reduce feedback overloads by transmitting the first analog matrix in a long term manner and transmitting associated feedback information corresponding to the linear combination matrix in a short term manner, which can also ensure that the base station may obtain the CSI feedback information corresponding to the user equipment reliably.

FIG. 3 is a structural diagram of a system for performing analog CSI feedback according to an embodiment of the present disclosure. The system includes a base station and a user equipment. The user equipment includes a first apparatus for performing analog CSI feedback, the first apparatus includes a first obtaining module 101 and a first transmitting module 102; the base station includes a second apparatus for obtaining an analog CSI matrix corresponding to a user equipment, the second apparatus includes a first receiving module 103 and a second obtaining module 104.

The first obtaining module 101 of the user equipment obtains an analog CSI matrix corresponding to the user equipment.

Wherein, the analog CSI matrix satisfies the following condition:

$$XX^H = D \quad (1)$$

where X denotes a R*K analog CSI matrix, R≤K, the symbol "H" denotes conjugate transpose of matrix, D denotes a diagonal matrix, wherein elements on the diagonals of the diagonal matrix D may be identical or different.

Hereinafter, the first obtaining module 101 will be further illustrated using the two preferred schemes.

Scheme 1:

The analog CSI matrix includes a third analog matrix corresponding to an estimation channel matrix, and the first obtaining module 101 further comprises a fifth sub-obtaining module (not shown). The fifth sub-obtaining module is configured to perform, by a user equipment, SVD (Singular Value Decomposition) to the estimation channel matrix estimated by the user equipment to obtain corresponding dominated singular values and dominated right singular vectors, and obtain the third analog matrix according to the dominated singular values and the dominated right singular vectors.

Herein, the dominated singular values refer to singular values that play a dominated role among the singular values obtained by performing the SVD, and the dominated right singular vectors refer to the right singular vectors that play a dominated role among the right singular vectors obtained by performing the SVD.

Assuming that the base station has M antennas and UE has N antennas, based on a downlink reference signal from the base station, the fifth sub-obtaining module may estimate a N*M downlink estimation channel matrix, denoted as A; by performing SVD to A, the following may be derived:

$$A = USV^H \quad (2)$$

where the left singular vector U is a N*J matrix and satisfies $U^H U = E$; the singular value S is a J*J diagonal matrix; the right singular vector V is a M*J matrix and satisfies $V^H V = E$; J is rank of A, and E is a unit matrix. V is used by the base station to perform beamforming or interference mitigation among different layers/UEs, U is used by the UE to perform beamforming or residual interference mitigation, while S is used for power allocation among a plurality of streams so as to maximize link capacity, therefore, only the matrices S and V are needed by the base station. It is further considered that in actuality, S is usually controlled only by a small portion of dominated diagonals; then if the number of these dominated diagonals I<J, it may be expressed below:

$$A \approx \tilde{U}\tilde{S}\tilde{V}^H \quad (3)$$

where the dominated left singular vectors $\tilde{U}$ is a N*I matrix, indicating left singular vectors that play a dominated role in U; the dominated singular values $\tilde{S}$ is an I*I matrix, indicating diagonals that play a dominated role in S; the dominated right singular vectors $\tilde{V}$ is a M*I matrix, indicating a right singular vectors that play a dominated role in V. Therefore, the third analog matrix B may be represented as:

$$B = \tilde{S}\tilde{V}^H \quad (4)$$

where B is an I*M matrix.

Scheme 2:

The analog CSI matrix includes a first analog matrix that needs to be transmitted to the base station in a long term manner and a second analog matrix that needs to be transmitted to the base station in a short term manner, and the first obtaining module 101 further comprises a first sub-obtaining module (not shown) and a second sub-obtaining module (not shown).

The first sub-obtaining module obtains dominated basis vectors for the subspace of channel statistics by decomposing a channel covariance matrix, and determines the first analog matrix based on the dominated basis vectors.

Herein, the dominated basis vectors are for indicating basis vectors that play a dominated role in the space. Herein, the first analog matrix is a combined matrix of the resulting basis vectors.

The present disclosure exploits the fact that the practical scattering geometry often makes that angle of departure of channel path at base station is limited spread. This results in a highly correlated channel. In actuality, the channel covariance matrix can be expressed as:

$$F = E(A^H A) \approx \sum_{i=1}^{L} \lambda_i g_i g_i^H \quad (5)$$

where F denotes a covariance matrix, $E(A^H A)$ denotes a desired value of $A^H A$, $g_i$ denotes a M*1 dominated basis vectors, L<M (M is the number of antennas of the base station), $\lambda_i$ is a coefficient corresponding to $g_i$. Further, based on the equation (5), it may be derived:

$$A \approx C[g_1 \ldots g_L]^H \quad (6)$$

where C is a linear combination matrix. The first analog matrix may be expressed as:

$$G = [g_1 \ldots g_L] \quad (7)$$

It should be noted that because the basis vectors of the subspace are mainly determined by a spatial angle of multipath, which usually changes slowly. Therefore, the first analog matrix resulting from combining the dominated basis vectors can be transmitted to the base station in a long term manner. Compared with the dominated basis vectors, elements in the linear combination matrix change faster according to Doppler spread. Therefore, the second analog matrix obtained later according to the linear combination matrix needs to be transmitted to the base station in a short term manner.

The second sub-obtaining module estimates a linear combination matrix corresponding to the first analog matrix according to a downlink reference signal from the base station, performs singular value decomposition to the linear combination matrix to obtain corresponding dominated singular values and dominated right singular vectors, and obtains the second analog matrix according to the dominated singular values and the dominated right singular vectors.

Herein, the downlink reference signal includes, but not limited to: a beamformed CSI-RS signal, a non-precoded CSI-RS signal, etc. If the downlink reference signal is a beamformed CSI-RS signal (using g1, g2, . . . , gL as the beamformer), the user equipment may estimate C as an equivalent channel matrix. If the downlink reference signal is a non-precoded CSI-RS signal, the user equipment may estimate C by considering the signal subspace spanned by G.

Herein, the elements in the linear combination matrix may be regarded as coefficients of the dominated basis vectors.

Specifically, the second sub-obtaining module estimates the linear combination matrix C corresponding to the first analog matrix according to the downlink reference signal from the base station, and performs singular value decomposition to C to obtain corresponding dominated singular values and dominated right singular vectors based on the equation below:

$$c=U'S'V'^H \approx \tilde{U}'\tilde{S}'\tilde{V}'^H \qquad (8)$$

where U', S', V' denote left singular vectors, singular values, right singular vectors resulting from performing SVD to C, respectively, $\tilde{U}'$, $\tilde{S}'$, $\tilde{V}'$ denote dominated left singular vectors of N*I', dominated singular values of I'*I', and dominated right singular vectors of I'*L' respectively, and I' is the number of dominated diagonals. Then, the second analog matrix B' corresponding to C may be expressed as:

$$B'=\tilde{S}'\tilde{V}'^H \qquad (9)$$

where B' is an I'*L matrix.

It needs to be noted that the operations performed by the first sub-obtaining module and the second sub-obtaining module are applicable to any antenna array.

Besides, as another preferred solution of the present embodiment, long-term feedback load size can be further reduced and feedback precision can be increased in a scenario of adopting a cross-polarized antenna array.

In the preferred solution, the first sub-obtaining module further comprises a third sub-obtaining module (not shown), and the second sub-obtaining module further comprises a fourth sub-obtaining module (not shown). The third sub-obtaining module averages channel covariance matrices in two polarized directions, obtains dominated basis vectors for the subspace of channel statistics by decomposing the matrix resulting from performing the averaging, and determines a first analog matrix corresponding to the user equipment according to the dominated basis vectors; the fourth sub-obtaining module estimates two linear combination matrices corresponding to the two polarized directions according to the downlink reference signal from the base station, respectively, merges the two linear combination matrices, and performs singular value decomposition to the merged matrix to obtain corresponding dominated singular values and dominated right singular vectors, and obtains a second analog matrix corresponding to the user equipment according to the dominated singular values and the dominated singular vectors.

Specifically, the third sub-obtaining module averages the channel covariance matrices in two polarized directions, and obtains the following dominated basis vectors by decomposing the matrix resulting from performing the averaging: $\bar{g}_1, \ldots \bar{g}_j, \ldots, \bar{g}_{L'}, j=1, \ldots, L', L'<M$, where $\bar{g}_j$ denotes basis vectors of (M/2)*1; then, the user equipment may determine the first analog matrix $\bar{G}$.

$$\bar{G}=[\bar{g}_1 \ldots \bar{g}_{L'}] \qquad (10)$$

The fourth sub-obtaining module estimates two linear combination matrices C1 and C2 corresponding to the two polarized directions according to the downlink reference signal from the base station, respectively, and merges C1 and C2 into C', and then performs singular value decomposition to C' based on the equation below, thereby obtaining the dominated singular values $\tilde{S}'$ and the dominated right singular vectors $\tilde{V}'$:

$$C'=\tilde{U}'\tilde{S}'\tilde{V}'^H \qquad (11)$$

where $\tilde{U}'$ denotes dominated singular vectors; afterwards, the user equipment may obtain a second analog matrix $\bar{B}'$ based on the equation below:

$$\bar{B}'\tilde{S}'\tilde{V}'^H \qquad (12)$$

It needs to be noted that the example above is only for better illustrating the technical solution of the present disclosure, not for limiting the present disclosure. Those skilled in the art should understand that any implementation manner of obtaining an analog CSI matrix corresponding to the user equipment should be included within the scope of the present disclosure.

The first transmitting module 102 obtains dominated element information corresponding to the analog CSI matrix according to predetermined index information, and transmits the dominated element information to the base station.

Herein, the predetermined index information is pre-stored in the base station and the user equipment; the predetermined index information includes any predetermined index information that can indicate respective elements which need to be transmitted to the base station (or do not need to be transmitted to the base station), e.g., indexes of respective elements that need to be transmitted to the base station in the matrix, indexes of respective elements that do not need to be transmitted to the base station in the matrix, etc. It needs to be noted that for a R*K matrix, the total number of elements that do not need to be transmitted to the base station is R(R−1)/2 (i.e., the total number of elements that need to be transmitted to the base station is (2K−R+1) R/2). Such elements that do not need to be transmitted to the base station are located in the (R−1) rows of the matrix, and the numbers of elements that do not need to be transmitted to the base station in each of the (R−1) rows are different.

It needs to be noted that if the indexes of the elements that do not need to be transmitted to the base station, as indicated by the predetermined index information, are represented as: $(a_1, b_{1,1}), (a_2, b_{2,1}), (a_2, b_{2,2}), \ldots, (a_{R-1}, b_{R-1,1}), \ldots, (a_{R-1}, b_{R-1,R-1})$, the following conditions should be satisfied:

$$a_m \neq a_n, \forall m \neq n$$

$$b_{m,n} \neq b_{m,k}, \forall n \neq k, \forall m$$

wherein, $a_m$ denotes the row having m elements that do not need to be transmitted to the base station, $1 \leq m \leq R-1$, $b_{m,n}$ denotes the column where the $n^{th}$ element that does not need to be transmitted to the base station in the row $a_m$, $1 \le n \le m$.

As an example, the R*K analog CSI matrix is shown in FIG. 5, wherein "x" denotes the elements that do not need to be transmitted to the base station, "○" denotes the elements that need to be transmitted to the base station, and the predetermined index information includes indexes corresponding to all "x." Moreover, it may be seen from FIG. 5 that only all elements in the first row need to be transmitted to the base station, 1 element in the $2^{nd}$ row does not need to be transmitted, 2 elements in the $3^{rd}$ row do not need to be transmitted, and so on; in the $R^{th}$ row, R−1 elements do not need to be transmitted.

Herein, the dominated element information corresponding to the analog CSI matrix includes, but not limited to: dominated element information in the analog CSI matrix, dominated element information in other matrices obtained based on the analog CSI matrix, etc. The dominated element information is for indicating elements that play a dominated role in a corresponding matrix.

Specifically, the implementation manner, in which the first transmitting module 102 extracts dominated element information in the analog CSI matrix according to the predetermined index information, and transmits the dominated element information to the base station, includes, but not limited to:

1) the first transmitting module 102 includes a first sub-transmitting module (not shown). The first sub-transmitting module extracts dominated element information in the analog CSI matrix according to the predetermined index information, and transmits the dominated element information to the base station.

As an example, a R*K analog CSI matrix is shown in FIG. 5, predetermined index information includes indexes of the elements that do not need to be transmitted to the base station as following: $(a_1, b_{1,1})$, $(a_2, b_{2,1})$, $(a_2, b_{2,2})$, . . . , $(a_{R-1}, b_{R-1,1})$, . . . , $(a_{R-1}, b_{R-1,R-1})$; the indexes are for "x" in the analog CSI matrix. The first sub-transmitting module extracts all elements corresponding to "○" in the analog CSI matrix according to the predetermined index information, and transmits the extracted elements as dominated element information to the base station.

Preferably, the first sub-transmitting module further comprises a row permutating module (not shown) and a second sub-transmitting module (not shown). The row permutating module permutates rows of the analog CSI matrix according to the permutation matrix; next, the second sub-transmitting module extracts dominated element information in the permutated matrix according to the predetermined index information, and transmits the dominated element information to the base station.

Specifically, the row permutating module permutates rows of the analog CSI matrix X based on the equation below:

$$X_p = PX \quad (13)$$

Wherein, P denotes a R*R permutation matrix and $X_p$ denotes a permutated matrix. Next, the user equipment extracts dominated element information in the permutated matrix according to the predetermined index information, and transmits the dominated element information to the base station. Particularly, the implementation manner of the second sub-transmitting module is similar to the implementation manner of the first sub-transmitting module, which is thus not detailed here.

It should be noted that the $X_p$ selected by the second sub-transmitting module when performing the transmitting operation, i.e., the selected permutation matrix P, needs to be determined by the equation below:

$$\min_{P \in Y} \sum_{(a,b) \in Z} |X_p(a,b)|^2 \quad (14)$$

where Y denotes a set of all predetermined permutation matrices, min denotes a minimal value function, $Z = \{(a_1, b_{1,1}), (a_2, b_{2,1}), (a_2, b_{2,2}), \ldots, (a_{R-1}, b_{R-1,1}), \ldots, (a_{R-1}, b_{R-1,R-1})\}$. The present preferred solution can make the power of unsent elements as small as possible, namely, make the power of elements transmitted to the base station as large as possible, such that the base station can estimate the (2K−R+1) R/2 elements transmitted to the base station more reliably, so as to recover the R(R−1)/2 elements unsent to the base station more reliably based on the elements transmitted to the base station.

2) the first transmitting module 102 comprises a transforming module (not shown) and a third sub-transmitting module (not shown). The transforming module obtains a transformation matrix corresponding to the analog CSI matrix according to the predetermined index information, and transform the analog CSI matrix based on the transformation matrix. The third sub-transmitting module extracts all non-zero elements in the transformed matrix, and transmits the non-zero elements as dominated element information corresponding to the analog CSI matrix to the base station, wherein the transformation matrix is an orthogonal matrix.

Specifically, the predetermined index information indicates the following indexes corresponding to the elements that do not need to be transmitted to the base station: $(a_1, b_{1,1})$, $(a_2, b_{2,1})$, $(a_2, b_{2,2})$, . . . , $(a_{R-1}, b_{R-1,1})$, . . . , $(a_{R-1}, b_{R-1,R-1})$. The transforming module first calculates a basis vector $s_1$ for the orthogonal complementary space of the space spanned according to the $b_{R-1,1}^{th}$ to $b_{R-1,R-1}^{th}$ column vectors in X, and uses the conjugate transpose $s_1^H$ of $s_1$ as the $a_{R-1}^{th}$ row of vectors of the transformation matrix W; next, calculates a basis vector $s_2$ for the orthogonal complementary space of the space spanned according to the $b_{R-2,1}^{th}$ to $b_{R-2,R-2}^{th}$ column vectors in X and $s_1$, and let the conjugate transpose $s_2^H$ of $s_2$ be the $a_{R-2}^{th}$ row of vectors of the transformation matrix W; and so on, till all row vectors of W are obtained. Then the transforming module obtains the matrix $\tilde{X}$ resulting from transforming X based on the equation below:

$$\tilde{X} = WX \quad (15)$$

In $\tilde{X}$, the elements corresponding to the abovementioned indexes are zero elements. Afterwards, the third sub-transmitting module extracts all non-zero elements in $\tilde{X}$, and transmits the non-zero elements as dominated element information corresponding to the analog CSI matrix to the base station.

As an example, the transforming module may obtain $\tilde{X}$ similar to the matrix structure shown in FIG. 5 by performing QR decomposition to the submatrix of X and obtaining the transformation matrix W in conjunction with the predetermined index information; when FIG. 5 is regarded as $\tilde{X}$, the "x" therein indicates zero element. Herein, X is split into $X_1$ and $X_2$, $X_1$ being a R*R submatrix; then $X_1$ may be subjected to QR decomposition to obtain an upper triangle matrix that is transposed into the transformation matrix W.

Compared with implementation manner 1), although the number of elements that need to be fed back are identical, implementation manner 2) has the following advantages: a) because power is concentrated on (2K−R+1) R/2 transmission symbols, the CSI estimation SINR is better than the implementation manner 1); b) because all channel coefficients are estimated independently, there is no estimation error propagation effect. Therefore, implementation manner 2) has a higher CSI feedback quality.

As another preferred solution of the first transmitting module 102, the first transmitting module 102 comprises a fourth sub-transmitting module (not shown) and a fifth sub-transmitting module (not shown). When the analog CSI matrix includes a first analog matrix that needs to be transmitted to the base station in a long term manner and a second analog matrix that needs to be transmitted to the base station in a short term manner, the fourth sub-transmitting module obtains the dominated element information corresponding to the first analog matrix according to the predetermined index information and transmits the dominated element information corresponding to the first analog matrix to the base station in a long term manner; and the fifth sub-transmitting module obtains the dominated element information corresponding to the second analog matrix according to the predetermined index information and transmits the dominated element information to the base station in a short term manner.

It needs to be noted that the long term manner means the user equipment performs corresponding transmitting operation in a relatively long term, while the short term manner means the user equipment performs corresponding transmitting operation in a relatively short term. Those skilled in the art should understand that there is no strict sequential relationship between the operation of obtaining the first analog matrix and the operation of obtaining the second analog matrix, and there is likewise no strict sequential relationship between the operation of transmitting the dominated element information corresponding to the first analog matrix and the operation of transmitting the dominated element information corresponding to the second analog matrix. For example, the user equipment performs the operation of obtaining the first analog matrix every time t1, and meanwhile transmits the dominated element information corresponding to the first analog matrix; moreover, the user equipment performs the operation of obtaining the second analog matrix every time t2, and meanwhile transmits the dominated element information corresponding to the second analog matrix, wherein t1>t2.

By combining the long-term manner and the short-term manner to implement analog CSI feedback, the preferred solution can utilize the feedback channel more effectively and decrease feedback load to a greater extent.

It needs to be noted that the example above is only for better illustrating the technical solution of the present disclosure, not for limiting the present disclosure. Those skilled in the art should understand that any implementation manner of obtaining the dominated element information corresponding to the analog CSI matrix according to the predetermined index information and transmitting the dominated element information to the base station should be included in the scope of the present disclosure.

The first receiving module 103 of the base station receives the dominated element information corresponding to the analog CSI matrix from the user equipment.

The second obtaining module 104 of the base station obtains the analog CSI matrix according to the predetermined index information and the dominated element information.

As a preferred solution, the dominated element information is extracted from the analog CSI matrix, and the second obtaining module 104 comprises a computing module (not shown). The computing module calculates other elements in the analog CSI matrix except the dominated element information according to the predetermined index information and the dominated element information, thereby obtaining the analog CSI matrix.

It needs to be noted that X is denoted as $X=[x_1^T \ldots x_r^T \ldots x_R^T]^T$, $r=1, \ldots, R$, wherein the symbol "T" denotes transposition of matrix; then based on the above equation (1), it is seen that X satisfies the following equation:

$$x_{r+1}X(1:r,:)^H = 0_{1*r} \tag{16}$$

where $x_{r+1}$ denotes the r+1$^{th}$ row of X, and X(1:r,:) denotes the 1$^{st}$ row to the r$^{th}$ row of X. The following may be further obtained:

$$X(1:r,1:r)^* x_{r+1}(1:r)^T = -X(1:r,r+1:K)^* x_{r+1}(r+1:K)^T \tag{17}$$

where X(1:r,1:r) consists of the 1$^{st}$ to r$^{th}$ row and the 1$^{st}$ to r$^{th}$ column of X, $x_{r+1}(1:r)$ consists of the 1$^{st}$ to r$^{th}$ elements in the r+1$^{th}$ row, and the "*" in the upper right corner denotes conjugate. It is seen from equation (17) that if X(1:r,:) and $x_{r+1}(r+1:K)$ are known, then $x_{r+1}(1:r)$ may be derived through calculation.

As an example, the first receiving module 103 receives dominated element information from the user equipment, the dominated element information including all elements where "∘" is located in FIG. 5; the computing module determines indexes of elements unsent to the base station based on the predetermined index information, and recovers the elements unsent to the base station based on the equation below:

$$X(1, 1)^* \underline{x_2(1)} = -X(1, 2:K)^* x_2(2:K)^T \tag{18}$$

$$X(1:2, 1:2)^* \underline{x_3(1:2)}^T = -X(1:2, 3:K)^* x_3(3:K)^T \tag{19}$$

$$\vdots$$

$$X(1:R-1, 1:R-1)^* \underline{x_R(1:R-1)}^T = -X(1:R-1, R:K)^* x_{r+1}(R:K)^T \tag{20}$$

Wherein the underlined part indicates that the matrix is unknown. Namely, for the analog CSI matrix shown in FIG. 5, the computing module first recovers the first element $x_2(1)$ in the second row according to the known first row vector X(1,:) and $x_2(2:K)$; next, the computing module obtains all elements of X(1:2,), and recovers $x_3(1:2)$ according to X(1:2,) and the known $x_3(3:K)$, and so on, till all elements at "x" in FIG. 5 are recovered.

It needs to be noted that when the dominated element information is extracted from the $X_p$, then after the computing module recovers the $X_p$ based on the preferred solution, the $X_p$ may be directly regarded as the analog CSI matrix corresponding to the user equipment.

As another preferred solution, the dominated element information includes all non-zero elements in the matrix resulting from transforming the analog CSI matrix; the second obtaining module comprises a determining module (not shown) and a sixth sub-obtaining module (not shown). The determining module determines the matrix resulting from transformation of the analog CSI according to the predetermined index information and the dominated element information, wherein other elements in the transformed matrix except the dominated element information are zero; afterwards, the sixth sub-obtaining module performs singular value decomposition to the transformed matrix to obtain singular values and right singular vectors corresponding to the transformed matrix, and then obtains the analog CSI matrix according to the singular values and the right singular vectors.

Particularly, the determining module sets all elements unsent to the base station to zero according to the predetermined index information, thereby obtaining the matrix $\tilde{X}$ resulting from transformation of X.

It is noted that based on equation (1), it may be found that X can be expressed into:

$$X = D^{1/2} Q \quad (21)$$

Wherein, Q is an orthogonal array; because D is a diagonal matrix, it may be found based on equation (21) and equation (15) that $WD^{1/2}Q$ is just the SVD of $\tilde{X}$; then, the sixth sub-obtaining module performs SVD to $\tilde{X}$:

$$\tilde{X} = \tilde{U}'' \tilde{S}'' \tilde{V}''^H \quad (22)$$

where $\tilde{U}''$, $\tilde{S}''$, $\tilde{V}''$ denote the left singular vectors, singular values, right singular vectors obtained from performing SVD, respectively; therefore, the following may be obtained:

$$X = \tilde{S}'' \tilde{V}''^H \quad (23)$$

Preferably, when the analog CSI matrix includes the first analog matrix transmitted to the base station in a long term manner and the second analog matrix transmitted to the base station in a short term manner, the second module further comprises a seventh sub-obtaining module (not shown). The seventh sub-obtaining module obtains a third analog matrix corresponding to the user equipment based on the first analog matrix and the second analog matrix.

For example, the analog CSI matrix includes the first analog matrix G and the second analog matrix B', and the seventh sub-obtaining module can obtain the third analog matrix B based on the equation below:

$$B = B' G^H \quad (24)$$

For another example, in a scenario in which the base station adopts cross-polarized antenna array, the analog CSI matrix includes the first analog matrix $\bar{G}$ and the second analog matrix $\bar{B}'$; the seventh sub-obtaining module may obtain the third analog matrix B based on the equation below:

$$B = \bar{B}' \begin{bmatrix} \bar{G}^H & 0 \\ 0 & \bar{G}^H \end{bmatrix} \quad (25)$$

It needs to be noted that the example above is only for better illustrating the technical solution of the present disclosure, rather than limiting the present disclosure. Those skilled in the art should understand that any implementation manner of obtaining the analog CSI matrix according to the predetermined index information and the dominated element information should be included within the scope of the present disclosure.

Although the analog feedback currently proposed might be a simple concept, it also faces many problems in practical applications, e.g., a) for large antenna array, the overheads of analog feedback may be very large; b) how to ensure that the base station can recover the CSI as much as possible.

According to the solution of the present embodiment, feedback overheads can be reduced to a great extent by transmitting the dominated element information corresponding to the analog CSI matrix to the base station, and a better CSI recovery quality can be implemented at the base station because of concentrating power at the dominated element information; moreover, feedback overheads can be further reduced by dividing the feedback process into two stages so as to transmit the dominated element information corresponding to the first analog matrix in a long term manner and transmit the dominated element information corresponding to the second analog matrix in a short term manner; in addition, because the analog CSI matrix satisfies the condition of $X X^H = D$, it may be directly used for further precoding and beamforming, thereby simplifying the implementation at the base station.

FIG. 4 is a structural diagram showing a system for performing analog CSI feedback according to another embodiment of the present disclosure. The system includes a base station and a user equipment. The user equipment includes a third apparatus for performing analog CSI feedback. The third apparatus includes a third obtaining module 201, an estimating module 202, and a second transmitting module 203; the base station includes a fourth apparatus for obtaining CSI feedback information corresponding to the user equipment, the fourth apparatus includes a second receiving module 204 and a fourth obtaining module 205.

The third obtaining module 201 obtains dominated basis vectors for subspace of channel statistics by decomposing a channel covariance matrix, and determines a first analog matrix corresponding to the user equipment based on the dominated basis vectors.

Particularly, the implementation manner of the third obtaining module 201 is identical or similar to the implementation manner of the aforementioned first sub-obtaining module, which is thus not detailed here.

The estimating module 202 estimates a linear combination matrix corresponding to the first analog matrix according to a downlink reference signal from the base station.

Particularly, the implementation manner, in which the estimating module 202 estimates the linear combination matrix corresponding to the first analog matrix according to the downlink reference signal from the base station, has been discussed in detail in the aforementioned embodiments, which is thus not detailed here.

The second transmitting module 203 transmits the first analog matrix to a base station in a long term manner, and transmits associated feedback information corresponding to the linear combination matrix to the base station in a short term manner.

Particularly, the associated feedback information includes any information that is determined based on the linear combination matrix and needs to be transmitted to the base station in a short term manner.

For example, the second transmitting module 203 directly uses the linear combination matrix C as the associated feedback information, and the user equipment transmits a first analog matrix G to the base station in a long term manner, and transmits C to the base station in a short term manner.

As a preferred solution, the second transmitting module 203 further comprises: a fifth obtaining module (not shown) and a third transmitting module (not shown). The fifth obtaining module performs singular value decomposition to the linear combination matrix to obtain corresponding dominated singular values and dominated right singular vectors, and obtains a second analog matrix corresponding to the linear combination matrix according to the dominated singular values and the dominated singular vectors; the third transmitting module transmits the first analog matrix to the base station in a long term manner, and transmits the second analog matrix as the associated feedback information to the base station in a short term manner.

Particularly, the implementation manner in which the fifth obtaining module obtains the second analog matrix has been described in detail in the aforementioned embodiments, which is thus not detailed here.

For example, the third transmitting module transmits the first analog matrix G to the base station in a long term manner, and transmits the second analog matrix B' to the base station in a short term manner.

It needs to be noted that preferably, in a scenario in which the base station adopts a cross-polarized antenna array, the first analog matrix is the abovementioned $\overline{G}$, the associated feedback information is the abovementioned $\overline{B}'$, and the third transmitting module transmits $\overline{G}$ to the base station in a long term manner and transmits $\overline{B}'$ to the base station in a short D term manner.

Compared with the scheme of directly using the linear combination matrix as associated feedback information, the preferred solution can further save the amount of feedback symbols.

It needs to be noted that the example above is only for better illustrating the technical solution of the present disclosure, not for limiting the present disclosure. Those skilled in the art should understand that any implementation manner, in which the user equipment transmits the first analog matrix to the base station in a long term manner and transmits the associated feedback information corresponding to the linear combination matrix to the base station, should be included within the scope of the present disclosure.

The second receiving module 204 of the base station receives the first analog matrix transmitted by the user equipment to the base station in a long term manner, and the associated feedback information corresponding to the linear combination matrix which is transmitted by the user equipment to the base station in a short term manner.

The fourth obtaining module 205 of the base station obtains the CSI feedback information corresponding to the user equipment according to the first analog matrix and the associated feedback information.

For example, the fourth obtaining module 205 obtains an approximate A according to the first analog matrix G and the linear combination matrix C in conjunction with equation (6).

Preferably, the associated feedback information is the second analog matrix corresponding to the user equipment.

For example, the fourth obtaining module 205 obtains a third analog matrix B corresponding to the user equipment according to the first analog matrix G and the second analog matrix B' in conjunction with the equation (24).

For another example, in a scenario in which the base station adopts a cross-polarized antenna array, the fourth obtaining module obtains the third analog matrix B corresponding to the user equipment according to the first analog matrix $\overline{G}$ and the second analog matrix $\overline{B}'$ in conjunction with the equation (25).

It needs to be noted that the example above is only for better illustrating the technical solution of the present disclosure, not for limiting the present disclosure. Those skilled in the art should understand that any implementation manner in which the base station obtains the CSI feedback information corresponding to the user equipment according to the first analog matrix and the associated feedback information should be included within the scope of the present disclosure.

Compared with the scheme of directly transmitting the estimation channel matrix in the prior art, the present embodiment can reduce feedback overloads by transmitting the first analog matrix in a long term manner and transmitting associated feedback information corresponding to the linear combination matrix in a short term manner, which can also ensure that the base station may obtain the CSI feedback information corresponding to the user equipment reliably.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although exemplary embodiments have been specifically illustrated and described above, those skilled in the art will understand that without departing from the spirit and scope of the claims, their forms and details may change somewhat. Here, the protection as sought is defined in the appended claims. These and other aspects of respective embodiments are prescribed in the following numbered clauses:

1. A method for performing analog CSI feedback in a user equipment, comprising:

a. obtaining an analog CSI matrix corresponding to the user equipment, the analog CSI matrix satisfies a condition below:

$$XX^H = D$$

where X denotes the analog CSI matrix, H denotes conjugate transpose of matrix, and D denotes a diagonal matrix;

b. obtaining dominated element information corresponding to the analog CSI matrix according to predetermined index information, and transmitting the dominated element information to a base station.

2. The method according to clause 1, wherein the step b comprises:

b1 extracting dominated element information in the analog CSI matrix according to the predetermined index information, and transmitting the dominated element information to the base station.

3. The method according to clause 2, wherein the step b1 further comprises:

permutating rows of the analog CSI matrix according to a permutation matrix;

extracting dominated element information in the permutated matrix according to the predetermined index information, and transmitting the dominated element information to the base station.

4. The method according to clause 1, wherein the step b comprises:

b2 obtaining a transformation matrix corresponding to the analog CSI matrix according to the predetermined index information, and transforming the analog CSI matrix based on the transformation matrix;

b3 extracting all non-zero elements in the transformed matrix, and transmitting the non-zero elements as dominated element information corresponding to the analog CSI matrix to the base station.

5. The method according to any one of clauses 1-4, wherein the analog CSI matrix comprises a first analog matrix and a second analog matrix, the step a comprises:

a1 obtaining dominated basis vectors for subspace of channel statistics by decomposing a channel covariance matrix, and determining the first analog matrix based on the dominated basis vectors;

a2 estimating a linear combination matrix corresponding to the first analog matrix according to a downlink reference signal from the base station, performing singular value decomposition to the linear combination matrix to obtain corresponding dominated singular values and dominated right singular vectors, and obtaining the second analog matrix according to the dominated singular values and the dominated right singular vectors;

wherein the step b comprises:

obtaining dominated element information corresponding to the first analog matrix according to the predetermined index information, and transmitting the dominated element information corresponding to the first analog matrix to the base station in a long term manner;

obtaining dominated element information corresponding to the second analog matrix according to the predetermined index information, and transmitting the dominated element information corresponding to the second analog matrix to the base station in a short term manner.

6. The method according to clause 5, wherein the base station adopts cross-polarized antenna array, the step a1 comprises:

averaging channel covariance matrixes in two polarized directions, obtaining dominated basis vectors for subspace of channel statistics by decomposing the matrix resulting from the averaging, and determining a first analog matrix corresponding to the user equipment according to the dominated basis vectors;

wherein the step a2 comprises:

estimating two linear combination matrixes corresponding to the two polarized directions according to a downlink reference signal from the base station, respectively, merging the two linear combination matrices, and performing singular value decomposition to the merged matrix to obtain corresponding dominated singular values and dominated right singular vectors, and obtaining a second analog matrix corresponding to the user equipment according to the dominated singular values and the dominated right singular vectors.

7. The method according to any one of clauses 1-4, wherein the analog CSI matrix comprises a third analog matrix, the step a comprising:

performing singular value decomposition to an estimation channel matrix estimated by the user equipment to obtain corresponding dominated singular values and dominated right singular vectors, and obtaining the third analog matrix according to the dominated singular values and the dominated right singular vectors.

8. A method for obtaining an analog CSI matrix corresponding to a user equipment in a base station, comprising:

A. receiving dominated element information corresponding to an analog CSI matrix from the user equipment;

B. obtaining the analog CSI matrix according to predetermined index information and the dominated element information;

wherein the analog CSI matrix satisfies a condition below:

$$XX^H = D$$

where X denotes the analog CSI matrix, H denotes conjugate transpose of matrix, and D denotes a diagonal matrix.

9. The method according to clause 8, wherein the dominated element information is extracted from the analog CSI matrix, the step B comprises:

calculating other elements in the analog CSI matrix except the dominated element information according to predetermined index information and the dominated element information, so as to obtain the analog CSI matrix.

10. The method according to clause 9, wherein the dominated element information includes all non-zero elements in a matrix resulting from transforming the analog CSI matrix, the step B comprises:

determining a matrix resulting from transforming the analog CSI according to predetermined index information and the dominated element information, wherein other elements in the transformed matrix except the dominated element information are zero;

performing singular value decomposition to the transformed matrix to obtain singular values and right singular vectors corresponding to the transformed matrix, and obtaining the analog CSI matrix according to the singular values and the right singular vectors.

11. The method according to any one of clauses 8-10, wherein the analog CSI matrix includes a first analog matrix transmitted to the base station in a long term manner and a second analog matrix transmitted to the base station in a short term manner.

12. The method according to clause 11, further comprising:

obtaining a third analog matrix corresponding to the user equipment according to the first analog matrix and the second analog matrix.

13. A first apparatus for performing analog CSI feedback in a user equipment, comprising:

a first obtaining module configured to obtain an analog CSI matrix corresponding to the user equipment, the analog CSI matrix satisfies a condition below:

$$XX^H = D$$

where X denotes the analog CSI matrix, H denotes conjugate transpose of matrix, and D denotes a diagonal matrix;

a first transmitting module configured to obtain dominated element information corresponding to the analog CSI matrix according to predetermined index information, and transmit the dominated element information to a base station.

14. The first apparatus according to clause 13, wherein the first transmitting module comprises:

a first sub-transmitting module configured to extract dominated element information in the analog CSI matrix according to the predetermined index information, and transmit the dominated element information to the base station.

15. The first apparatus according to clause 14, wherein the first sub-transmitting module further comprises:

a row permutating module configured to permutate rows of the analog CSI matrix according to a permutation matrix;

a second sub-transmitting module configured to extract dominated element information in the permutated matrix according to the predetermined index information, and transmit the dominated element information to the base station.

16. The first apparatus according to clause 13, wherein the first transmitting module comprises:

a transforming module configured to obtain a transformation matrix corresponding to the analog CSI matrix according to the predetermined index information, and transform the analog CSI matrix based on the transformation matrix;

a third sub-transmitting module configured to extract all non-zero elements in the transformed matrix, and transmit the non-zero elements as dominated element information corresponding to the analog CSI matrix to the base station.

17. The first apparatus according to any one of clauses 13-16, wherein the analog CSI matrix comprises a first analog matrix and a second analog matrix, the first obtaining module comprises:

a first sub-obtaining module configured to obtain dominated basis vectors for subspace of channel statistics by decomposing a channel covariance matrix, and determine the first analog matrix based on the dominated basis vectors;

a second sub-obtaining module configured to estimate a linear combination matrix corresponding to the first analog matrix according to a downlink reference signal from the base station, performing singular value decomposition to the linear combination matrix to obtain corresponding dominated singular values and dominated right singular vectors, and obtain the second analog matrix according to the dominated singular values and the dominated right singular vectors;

wherein the first transmitting module comprises:

a fourth sub-transmitting module configured to obtain dominated element information corresponding to the first analog matrix according to the predetermined index information, and transmit the dominated element information corresponding to the first analog matrix to the base station in a long term manner;

a fifth sub-transmitting module configured to obtain dominated element information corresponding to the second analog matrix according to the predetermined index information, and transmit the dominated element information corresponding to the second analog matrix to the base station in a short term manner.

18. The first apparatus according to clause 17, wherein the base station adopts cross-polarized antenna array, the first sub-obtaining module comprises:

a third sub-obtaining module configured to average channel covariance matrixes in two polarized directions, obtain dominated basis vectors for subspace of channel statistics by decomposing the matrix resulting from the averaging, and determine a first analog matrix corresponding to the user equipment according to the dominated basis vectors;

wherein the second sub-obtaining module comprises:

a fourth sub-obtaining module configured to estimate two linear combination matrixes corresponding to the two polarized directions according to a downlink reference signal from the base station, respectively, merging the two linear combination matrices, and perform singular value decomposition to the merged matrix to obtain corresponding dominated singular values and dominated right singular vectors, and obtain a second analog matrix corresponding to the user equipment according to the dominated singular values and the dominated right singular vectors.

19. The first apparatus according to any one of clauses 13-16, wherein the analog CSI matrix comprises a third analog matrix, the first obtaining module comprising:

a fifth sub-obtaining module configured to perform singular value decomposition to an estimation channel matrix estimated by the user equipment to obtain corresponding dominated singular values and dominated right singular vectors, and obtain the third analog matrix according to the dominated singular values and the dominated right singular vectors.

20. A second apparatus for obtaining an analog CSI matrix corresponding to a user equipment in a base station, comprising:

a first receiving module configured to receive dominated element information corresponding to an analog CSI matrix from the user equipment;

a second obtaining module configured to obtain the analog CSI matrix according to the dominated element information and predetermined index information;

wherein the analog CSI matrix satisfies a condition below:

$$XX^H = D$$

where X denotes the analog CSI matrix, H denotes conjugate transpose of matrix, and D denotes a diagonal matrix.

21. The second apparatus according to clause 20, wherein the dominated element information is extracted from the analog CSI matrix, the second obtaining module comprises:

a calculating module configured to calculate other elements in the analog CSI matrix except the dominated element information according to predetermined index information and the dominated element information, so as to obtain the analog CSI matrix.

22. The second apparatus according to clause 20, wherein the dominated element information includes all non-zero elements in a matrix resulting from transforming the analog CSI matrix, the second obtaining module comprises:

a determining module configured to determine a matrix resulting from transforming the analog CSI according to predetermined index information and the dominated element information, wherein other elements in the transformed matrix except the dominated element information are zero;

a sixth sub-obtaining module configured to perform singular value decomposition to the transformed matrix to obtain singular values and right singular vectors corresponding to the transformed matrix, and obtain the analog CSI matrix according to the singular values and the right singular vectors.

23. The second apparatus according to any one of clauses 20-22, wherein the analog CSI matrix includes a first analog matrix transmitted to the base station in a long term manner and a second analog matrix transmitted to the base station in a short term manner.

24. The second apparatus according to clause 23, further comprising:

a seventh sub-obtaining module configured to obtain a third analog matrix corresponding to the user equipment according to the first analog matrix and the second analog matrix.

25. A system for performing analog CSI feedback, comprising the first apparatus according to any one of clauses 13-19, and a second apparatus according to any one of clauses 20-24.

26. A method for performing analog CSI feedback in a user equipment, comprising:

x. obtaining dominated basis vectors for subspace of channel statistics by decomposing a channel covariance matrix, and determining a first analog matrix corresponding to the user equipment according to the dominated basis vectors;

y. estimating a linear combination matrix corresponding to the first analog matrix according to a downlink reference signal from a base station;

z. transmitting the first analog matrix to the base station in a long term manner, and transmitting associated feedback information corresponding to the linear combination matrix to the base station in a short term manner.

27. The method according to clause 26, wherein the step z comprises:

performing singular value decomposition to the linear combination matrix to obtain corresponding dominated singular values and dominated right singular vectors, and obtaining a second analog matrix corresponding to the linear combination matrix according to the dominated singular values and the dominated right singular vectors;

transmitting the first analog matrix to the base station in a long term manner, and transmitting the second analog matrix as the associated feedback information to the base station in a short term manner.

28. A method for obtaining CSI feedback information corresponding to a user equipment in a base station, comprising:

Receiving a first analog matrix transmitted by the user equipment to the base station in a long term manner, and associated feedback information corresponding to a linear combination matrix transmitted by the user equipment to the base station in a short term manner;

obtaining CSI feedback information corresponding to the user equipment according to the first analog matrix and the associated feedback information.

29. The method according to clause 28, wherein the associated feedback information is a second analog matrix corresponding to the linear combination matrix.

30. A third apparatus for performing analog CSI feedback in a user equipment, comprising:

a third obtaining module configured to obtain dominated basis vectors for subspace of channel statistics by decomposing a channel covariance matrix, and determine a first analog matrix corresponding to the user equipment according to the dominated basis vectors;

an estimating module configured to estimate a linear combination matrix corresponding to the first analog matrix according to a downlink reference signal from a base station; and a second transmitting module configured to transmit the first analog matrix to the base station in a long term manner, and transmit associated feedback information corresponding to the linear combination matrix to the base station in a short term manner.

31. The third apparatus according to clause 30, wherein the second transmitting module comprises:

a fifth obtaining module configured to perform singular value decomposition to the linear combination matrix to obtain corresponding dominated singular values and dominated right singular vectors, and obtain a second analog matrix corresponding to the linear combination matrix according to the dominated singular values and the dominated right singular vectors;

a third transmitting module configured to transmit the first analog matrix to the base station in a long term manner, and transmit the second analog matrix as the associated feedback information to the base station in a short term manner.

32. A fourth apparatus for obtaining CSI feedback information corresponding to a user equipment in a base station, comprising:

a second receiving module configured to receive a first analog matrix transmitted by the user equipment to the base station in a long term manner, and associated feedback information corresponding to a linear combination matrix transmitted by the user equipment to the base station in a short term manner;

a fourth obtaining module configured to obtain CSI feedback information corresponding to the user equipment according to the first analog matrix and the associated feedback information.

33. The fourth apparatus according to clause 32, wherein the associated feedback information is a second analog matrix corresponding to the linear combination matrix.

34. A system for performing CSI feedback, comprising a third apparatus according to clause 30 or 31, and a fourth apparatus according to clause 32 or 33.

The invention claimed is:

1. A method for performing analog Channel State Information (CSI) feedback in a user equipment, comprising:

obtaining an analog CSI matrix corresponding to the user equipment, the analog CSI matrix satisfies a condition below:

$$X X^H = D$$

where X denotes the analog CSI matrix, H denotes conjugate transpose of matrix, and D denotes a diagonal matrix;

obtaining dominated element information corresponding to the analog CSI matrix according to predetermined index information, and transmitting the dominated element information to a base station, wherein the predetermined index information includes any predetermined index information that can indicate respective elements which need to be transmitted to the base station, wherein the dominated element information includes all non-zero elements in a matrix resulting from transforming the analog CSI matrix and the analog CSI matrix is obtained by:

determining a matrix resulting from transforming the analog CSI according to predetermined index information and the dominated element information, wherein other elements in the transformed matrix except the dominated element information are zero;

performing singular value decomposition to the transformed matrix to obtain singular values and right singular vectors corresponding to the transformed matrix, and obtaining the analog CSI matrix according to the singular values and the right singular vectors.

2. The method according to claim 1, wherein the obtaining dominated element information comprises:

extracting dominated element information in the analog CSI matrix according to the predetermined index information, and transmitting the dominated element information to the base station.

3. The method according to claim 1, wherein the obtaining dominated element information comprises:

obtaining a transformation matrix corresponding to the analog CSI matrix according to the predetermined index information, and transforming the analog CSI matrix based on the transformation matrix;

extracting all non-zero elements in the transformed matrix, and transmitting the non-zero elements as dominated element information corresponding to the analog CSI matrix to the base station.

4. A method for obtaining an analog Channel State Information (CSI) matrix corresponding to a user equipment in a base station, comprising:
receiving dominated element information corresponding to an analog CSI matrix from the user equipment;
obtaining the analog CSI matrix according to predetermined index information and the dominated element information;
wherein the analog CSI matrix satisfies a condition below:

$$XX^H = D$$

where X denotes the analog CSI matrix, H denotes conjugate transpose of matrix, and D denotes a diagonal matrix, and
wherein the predetermined index information includes any predetermined index information that can indicate respective elements which need to be transmitted to the base station,
wherein the dominated element information includes all non-zero elements in a matrix resulting from transforming the analog CSI matrix, and the obtaining comprises:
determining a matrix resulting from transforming the analog CSI according to predetermined index information and the dominated element information, wherein other elements in the transformed matrix except the dominated element information are zero;
performing singular value decomposition to the transformed matrix to obtain singular values and right singular vectors corresponding to the transformed matrix, and obtaining the analog CSI matrix according to the singular values and the right singular vectors.

5. The method according to claim 4, wherein the dominated element information is extracted from the analog CSI matrix, the obtaining comprises:
calculating other elements in the analog CSI matrix except the dominated element information according to predetermined index information and the dominated element information, so as to obtain the analog CSI matrix.

6. A first apparatus for performing analog Channel State Information (CSI) feedback in a user equipment, comprising:
at least one processor; and
at least one memory including computer program code;
the at least one memory and the computer program code configured to, with the at least one processor, cause the first apparatus at least to perform:
obtaining an analog CSI matrix corresponding to the user equipment, the analog CSI matrix satisfies a condition below:

$$XX^H = D$$

where X denotes the analog CSI matrix, H denotes conjugate transpose of matrix, and D denotes a diagonal matrix;
obtaining dominated element information corresponding to the analog CSI matrix according to predetermined index information, and transmit the dominated element information to a base station,
wherein the predetermined index information includes any predetermined index information that can indicate respective elements which need to be transmitted to the base station,
wherein the dominated element information includes all non-zero elements in a matrix resulting from transforming the analog CSI matrix and the analog CSI matrix is obtained by:
determining a matrix resulting from transforming the analog CSI according to predetermined index information and the dominated element information, wherein other elements in the transformed matrix except the dominated element information are zero;
performing singular value decomposition to the transformed matrix to obtain singular values and right singular vectors corresponding to the transformed matrix, and obtaining the analog CSI matrix according to the singular values and the right singular vectors.

7. A second apparatus for obtaining an analog Channel State Information (CSI) matrix corresponding to a user equipment in a base station, comprising:
at least one processor; and
at least one memory including computer program code;
the at least one memory and the computer program code configured to, with the at least one processor, cause the second apparatus at least to perform:
receiving dominated element information corresponding to an analog CSI matrix from the user equipment;
obtaining the analog CSI matrix according to predetermined index information and the dominated element information;
wherein the analog CSI matrix satisfies a condition below:

$$XX^H = D$$

where X denotes the analog CSI matrix, H denotes conjugate transpose of matrix, and D denotes a diagonal matrix,
wherein the predetermined index information includes any predetermined index information that can indicate respective elements which need to be transmitted to the base station,
wherein the dominated element information includes all non-zero elements in a matrix resulting from transforming the analog CSI matrix and the obtaining comprises:
determining a matrix resulting from transforming the analog CSI according to predetermined index information and the dominated element information, wherein other elements in the transformed matrix except the dominated element information are zero;
performing singular value decomposition to the transformed matrix to obtain singular values and right singular vectors corresponding to the transformed matrix, and obtaining the analog CSI matrix according to the singular values and the right singular vectors.

8. A system for performing analog Channel State Information (CSI) feedback, comprising a first apparatus for performing analog CSI feedback in a user equipment, comprising:
at least one processor; and
at least one memory including computer program code;
the at least one memory and the computer program code configured to, with the at least one processor, cause the first apparatus at least to perform:
obtaining an analog CSI matrix corresponding to the user equipment, the analog CSI matrix satisfies a condition below:

$$XX^H = D$$

where X denotes the analog CSI matrix, H denotes conjugate transpose of matrix, and D denotes a diagonal matrix;

obtaining dominated element information corresponding to the analog CSI matrix according to predetermined index information, and transmit the dominated element information to a base station for performing analog CSI feedback in a user equipment;
and
a second apparatus according to claim 7.

* * * * *